(12) United States Patent
Dlott et al.

(10) Patent No.: US 8,489,437 B1
(45) Date of Patent: Jul. 16, 2013

(54) METHOD AND SYSTEM AUTOMATICALLY TO CERTIFY AN AGRICULTURAL PRODUCT

(75) Inventors: Jeffrey W. Dlott, Watsonville, CA (US); Harry W. Rosenberg, Pittsburgh, PA (US); Clifford P. Ohmart, Davis, CA (US); Rebecca Connolly, Watsonville, CA (US)

(73) Assignee: SureHarvest, Soquel, CA (US)

( * ) Notice: Subject to any disclaimer, the term of this patent is extended or adjusted under 35 U.S.C. 154(b) by 1016 days.

(21) Appl. No.: 09/705,373

(22) Filed: Nov. 2, 2000

(51) Int. Cl.
*G06Q 99/00* (2006.01)

(52) U.S. Cl.
USPC .............................. 705/7.11; 705/1.1

(58) Field of Classification Search
USPC .......................... 705/7, 1, 7.11, 1.1
See application file for complete search history.

(56) References Cited

U.S. PATENT DOCUMENTS

| | | | |
|---|---|---|---|
| 4,209,131 A * | 6/1980 | Barash et al. .................... 239/68 |
| RE31,023 E * | 9/1982 | Hall, III ........................... 405/37 |
| 4,463,706 A | 8/1984 | Meister et al. ............. 119/51.02 |
| 4,493,290 A | 1/1985 | Gibbard ...................... 119/51.02 |
| 4,617,876 A | 10/1986 | Hayes ........................... 119/842 |
| 5,173,079 A | 12/1992 | Gerrish ............................. 460/7 |
| 5,246,164 A | 9/1993 | McCann et al. ................ 239/11 |
| 5,285,383 A | 2/1994 | Lindsey et al. ................ 705/26 |
| 5,327,708 A | 7/1994 | Gerrish ............................... 56/1 |
| 5,379,057 A | 1/1995 | Clough et al. ................ 345/173 |
| 5,478,990 A | 12/1995 | Montanari et al. ........... 235/375 |
| 5,566,069 A | 10/1996 | Clark, Jr. et al. ................. 702/2 |
| 5,673,647 A | 10/1997 | Pratt |
| 5,699,244 A | 12/1997 | Clark, Jr. et al. |
| 5,803,906 A | 9/1998 | Pratt et al. |
| 5,808,916 A | 9/1998 | Orr et al. ........................... 703/6 |
| 5,828,751 A | 10/1998 | Walker et al. ................. 713/175 |
| 5,845,229 A | 12/1998 | Rawlins ............................ 702/2 |
| 5,870,689 A | 2/1999 | Hale et al. ......................... 702/5 |
| 5,885,461 A | 3/1999 | Tetrault et al. ................ 210/652 |
| 5,897,619 A | 4/1999 | Hargrove, Jr. et al. ........... 705/4 |
| 5,905,653 A | 5/1999 | Higham et al. ............... 700/244 |
| 5,924,072 A | 7/1999 | Havens ............................. 705/1 |
| 5,960,402 A | 9/1999 | Embutsu et al. ................. 705/1 |
| 5,999,909 A | 12/1999 | Rakshit et al. ................... 705/2 |
| 6,023,223 A * | 2/2000 | Baxter, Jr. ..................... 340/531 |
| 6,063,254 A | 5/2000 | Rosenberg et al. ........... 205/398 |
| 6,064,943 A | 5/2000 | Clark, Jr. et al. ................. 702/2 |
| 6,067,549 A | 5/2000 | Smalley et al. ............ 707/104.1 |
| 6,114,699 A * | 9/2000 | Barton et al. ............ 250/339.09 |
| 6,119,531 A | 9/2000 | Wendte et al. ............. 73/863.52 |

(Continued)

OTHER PUBLICATIONS

Ford, D.A. et al, Using GLEAMS to evaluate the agricultural waste application rule-based decision, 19930101, Water Science and Technology, vol. 28, Issue 3-5, pp. 625-634.*

(Continued)

*Primary Examiner* — Akiba Allen

(74) *Attorney, Agent, or Firm* — Schwegman Lundberg & Woessner, P.A.

(57) ABSTRACT

A method automatically to certify an agricultural product includes receiving agricultural product data, writing to an agricultural product, at a management information system. The agricultural product data may reflect any one of multiple conditions (e.g., production conditions, processing conditions, packaging conditions and transport conditions) relating to the agricultural product. The agricultural product data is automatically contained against compliance requirements stored by the management information system. A compliance result is then automatically generated based on the comparison of the agricultural product data against the compliance requirements.

11 Claims, 23 Drawing Sheets

U.S. PATENT DOCUMENTS

| | | | |
|---|---|---|---|
| 6,135,055 A | 10/2000 | Pratt | |
| 6,148,249 A | 11/2000 | Newman | 700/225 |
| 6,200,210 B1 | 3/2001 | Pratt | |
| 6,211,789 B1 | 4/2001 | Oldham et al. | 340/573.3 |
| 6,231,435 B1 | 5/2001 | Pilger | 452/157 |
| 6,285,938 B1 | 9/2001 | Lang et al. | 701/50 |
| 6,318,289 B1 | 11/2001 | Pratt | |
| 6,327,569 B1 | 12/2001 | Reep | 705/1 |
| 6,342,839 B1 | 1/2002 | Curkendall et al. | |
| 6,346,885 B1 | 2/2002 | Curkendall | 340/572.4 |
| 6,393,899 B1 * | 5/2002 | Shedd et al. | 73/61.41 |
| 6,401,041 B1 * | 6/2002 | Petersen | 702/5 |
| 6,451,580 B1 * | 9/2002 | Takagi et al. | 435/243 |
| 6,516,746 B2 | 2/2003 | Pratt | |
| 6,547,726 B2 | 4/2003 | Pratt et al. | |
| 6,569,092 B1 | 5/2003 | Guichon et al. | |
| 6,581,829 B2 | 6/2003 | Kim | 235/385 |
| 6,691,135 B2 | 2/2004 | Pickett et al. | 707/104.1 |
| 6,796,504 B2 | 9/2004 | Robinson | |
| 6,995,675 B2 | 2/2006 | Curkendall et al. | |
| 7,440,901 B1 | 10/2008 | Dlott et al. | |
| 2012/0273568 A1 | 11/2012 | Dlott et al. | |
| 2012/0273569 A1 | 11/2012 | Dlott et al. | |
| 2012/0284320 A1 | 11/2012 | Dlott et al. | |
| 2013/0008942 A1 | 1/2013 | Dlott et al. | |
| 2013/0008943 A1 | 1/2013 | Dlott et al. | |
| 2013/0008944 A1 | 1/2013 | Dlott et al. | |
| 2013/0008945 A1 | 1/2013 | Dlott et al. | |
| 2013/0008950 A1 | 1/2013 | Dlott et al. | |
| 2013/0013524 A1 | 1/2013 | Dlott et al. | |
| 2013/0013525 A1 | 1/2013 | Dlott et al. | |
| 2013/0016214 A1 | 1/2013 | Dlott et al. | |

OTHER PUBLICATIONS

"Commodity Specific Guidelines for Wine Grapes in the Pacific Northwest", The Food Alliance 2000, No Date Given, pp. 1-24.

"Conservation Agriculture Network Complete Standards for Banana Certification", Conservation Agriculture Network, Banana Standards, No Date Given, pp. 1-19, Version 9-99.

U.S. Appl. No. 09/705,393 Final Office Action mailed Feb. 28, 2006, 7 pgs.

U.S. Appl. No. 09/705,393 Final Office Action mailed Jun. 6, 2007, 8 pgs.

U.S. Appl. No. 09/705,393 Non Final Office Action mailed Nov. 15, 2006, 6 pgs.

U.S. Appl. No. 09/705,393 Response filed May 14, 2007 to Non Final Office Action mailed Nov. 15, 2006, 11 pgs.

U.S. Appl. No. 09/705,393 Response filed Aug. 29, 2007 to Final Office Action mailed Jun. 6, 2007, 9 pgs.

U.S. Appl. No. 09/705,393, Notice of Allowance mailed May 6, 2008, 10 pgs.

International Search Report; PCT/US01/42577; Realtoolbox; International Filing Date Oct. 8, 2001.

Hamit Francis; "Precision Farming: New Imaging Opportunity Married to GIS and GPS"; Advanced Imaging, v11, n8, p. 74 (4); Aug. 1996(3 pages).

"U.S. Appl. No. 09/705,393, Advisory Action mailed Sep. 14, 2007", 3 pgs.

"U.S. Appl. No. 09/705,393, Examiner interview Summary mailed May 18, 2007", 4 pgs.

"U.S. Appl. No. 09/705,393, Final Office Action mailed Feb. 28, 2006", 6 pgs.

"U.S. Appl. No. 09/705,393, Non Final Office Action mailed Mar. 15, 2004", 6 pgs.

"U.S. Appl. No. 09/705,393, Pre-Appeal Brief Request filed Nov. 6, 2007", 4 pgs.

"U.S. Appl. No. 09/705,393, Response filed Feb. 17, 2004 to Restriction Requirement mailed Dec. 15, 2003", 10 pgs.

"U.S. Appl. No. 09/705,393, Response filed Aug. 28, 2006 to Final Office Action mailed Feb. 28, 2006", 11 pgs.

"U.S. Appl. No. 09/705,393, Response filed Sep. 15, 2004 to Non Final Office Action mailed Mar. 15, 2004", 13 pgs.

"U.S. Appl. No. 09/705,393, Restriction Requirement mailed Dec. 15, 2003", 4 pgs.

* cited by examiner

620

| Weekly Pest Management Monitoring ||
|---|---|
| Vineyard: 12A | Owner/Manager: Joe Grapevine |
| Sample date: 07/10/2000 ||

| Northwest Quarter: | | Northeast Quarter: | |
|---|---|---|---|
| Grape Leafhopper: (nymphs) | 0.2/ leaf | Grape Leafhopper: (nymphs) | 1.4/ leaf |
| Variegated Leafhopper: (nymphs) | 0. / leaf | Variegated Leafhopper: (nymphs) | 0. / leaf |
| Pacific Mites: | 0% infested leaves | Pacific Mites: | 0% infested leaves |
| Willamette Mites: | 20% infested leaves | Willamette Mites: | 20% infested leaves |
| % Leaves with predators: | 0% | % Leaves with predators: | 0% |
| Bunch Rot: | none found | Bunch Rot: | none found |
| Powdery Mildew: | none found | Powdery Mildew: | none found |
| Southwest Quarter: | | Southeast Quarter: | |
| Grape Leafhopper: (nymphs) | 1.9/ leaf | Grape Leafhopper: (nymphs) | 2.1/ leaf |
| Variegated Leafhopper: (nymphs) | 0. / leaf | Variegated Leafhopper: (nymphs) | 0. / leaf |
| Pacific Mites: | 0% infested leaves | Pacific Mites: | 0% infested leaves |
| Willamette Mites: | 20% infested leaves | Willamette Mites: | 20% infested leaves |
| % Leaves with predators: | 0% | % Leaves with predators: | 0% |
| Bunch Rot: | none found | Bunch Rot: | none found |
| Powdery Mildew: | none found | Powdery Mildew: | none found |

Comments:
There are a few grape leafhopper adults scattered throughout the vineyard but the numbers are low.

FIG. 17B

METHOD AND SYSTEM AUTOMATICALLY TO CERTIFY AN AGRICULTURAL PRODUCT

FIELD OF THE INVENTION

The present invention relates to information systems (IS) technology and information appliances for, inter alia, agricultural certification compliance, agricultural regulatory compliance, agricultural process management, and agricultural product marketing. More particularly, the present invention relates to capturing and providing data about agricultural products, practices and conditions with high integrity and credibility to consumers, regulatory agencies and certification authorities, agricultural process managers and agricultural product developers, processors and handlers.

BACKGROUND OF THE INVENTION

Consumers and purchasers of food and other agricultural products are becoming increasingly concerned about the exact natures of the foods that they are eating and the effect of agricultural practices on the environment. The public is directing the government to establish and enforce increasingly stringent regulations on the practices of farmers, ranchers, and food processors. Independent certification organizations with progressive agendas for environmental stewardship are gaining significant momentum and influence in the marketplace. The predominance of agriculture as the primary cause of surface water pollution in the United States is fueling the concerns of the voting public and consumers in general about the good environmental stewardship aspects and obligations of agricultural operations. The contribution of pollution to rivers, lakes and estuaries by agricultural operations, via the generation and/or introduction into the environment of pesticides, nutrients, siltation, pathogens and organic enrichment, is becoming more evident in the public and commercial discourse.

The work of M. Tetrault and D. Grandbois, as disclosed in U.S. Pat. No. 5,885,461, issued 23 Mar. 1997, "Process and system for treatment of pig and swine manure for environmental enhancement", is an example of inventive efforts to reduce the environmental impact of agricultural operations. Tetrault and Grandbois developed a protocol to remove water and sludge from animal waste of such a composition that the water and the sludge may be safely returned to the external environment and thus reduce pollution of animal manure, both liquid and solid, as generated by domestic animal farms. The efforts disclosed by Tetrault and Grandbois are biological and chemical in concept and in application and do not employ the value of information technology to the challenges of reducing pollution generation on farms.

R. Hargrove and C. Zind, in U.S. Pat. No. 5,897,619, issued Apr. 27, 1999, "Farm management system", present a technique of using an interactive information technology to, quoting here from the Abstract, "acquire, portray, and process field related data to thereby set rates on a field by field basis, verify that each policy complies with company, state, and federal regulations, verify that the configuration of each field allows the field to be insurable, and provide a method to validate claims of crop damage caused by weather."

Looking in developments outside the scope of agricultural practices, U.S. Pat. No. 5,999,909, issued 7 Dec. 1999, "Methods for establishing certifiable informed consent for a procedure", A. Rakshit and W. Judd, reports in the Abstract that, "a method for establishing certifiable patient informed consent for a medical procedure, where, in one embodiment, the patient interacts with a video training system until mastery of all required information is successfully achieved. Training techniques which permit elicitation of measurable behaviors from a patient as a guide to discerning the level of knowledge of the patient are utilized. Certification is only granted when the measurable behavior approximately coincide with the legal and medical standards for establishing informed consent." Rakshit and Judd thereby use an information technology system to correlate a statistical probability of subjective understanding of a respondent in a particular instant with the behavior of this sole respondent and upon the bases of earlier comprehensive studies of the association of numerous respondents' behaviors with their contemporaneous levels of understanding.

Conventional approaches have attempted to thoughtfully empower agricultural process managers with tools and techniques efficiently and effectively to address the concerns of consumers, certifying bodies and governmental agencies. The existing suites of environmental certification standards (e.g., Federal and State organic food laws and non-governmental eco-label certification programs) neither require nor prescribe real-time certified monitoring of agricultural production practices. There presently exists a mismatch between the methods and tools of prior art data collection, as well as conventional automated analysis systems, and the informational needs and demands of the agricultural process manager, public and regulatory and certifying agencies, agricultural product processing, transportation and distribution agents, and consumers. In addition, there is a rapidly increasing concern on the part of the public and dedicated environmental organizations about the over use of pesticides and any resulting degradation of the environment by agricultural operations.

Much of the raw data required by an agricultural manager to make critical decisions is obtained in the field. In particular, agricultural managers spend significant portions of their budgets on pesticide acquisition and application. Decisions made in pesticide use are largely based upon field data describing pest population detection and counts, and this data is managed outside of any formal reporting and documenting structure.

The external pressures upon agricultural managers to justify pesticide use and to document the integrity of their pesticide decision-making is rapidly growing. Most agricultural managers are as concerned about the environment as other citizens, and actively seek to improve the quality of their decision-making and to demonstrate their sincerity to the public.

SUMMARY OF THE INVENTION

According to the present invention, there is provided a method of automatically certifying an agricultural product. Agricultural product data relating to an agricultural product is received at a management information system. The agricultural product data is automatically compared against compliance requirements stored by the management information system. A compliance result is automatically generated based on the automatic comparison of the agricultural product data against the compliance requirements.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 17B illustrates an example of a weekly pest management monitoring report, as generated by the agricultural management information system.

DETAILED DESCRIPTION

A method and system automatically to certify an agricultural product are described. In the following description, for purposes of explanation, numerous specific details are set forth in order to provide a thorough understanding of the present invention. It will be evident, however, to one skilled in the art that the present invention may be practiced without these specific details.

Agricultural System—Overview and Terminology

Figure 1:
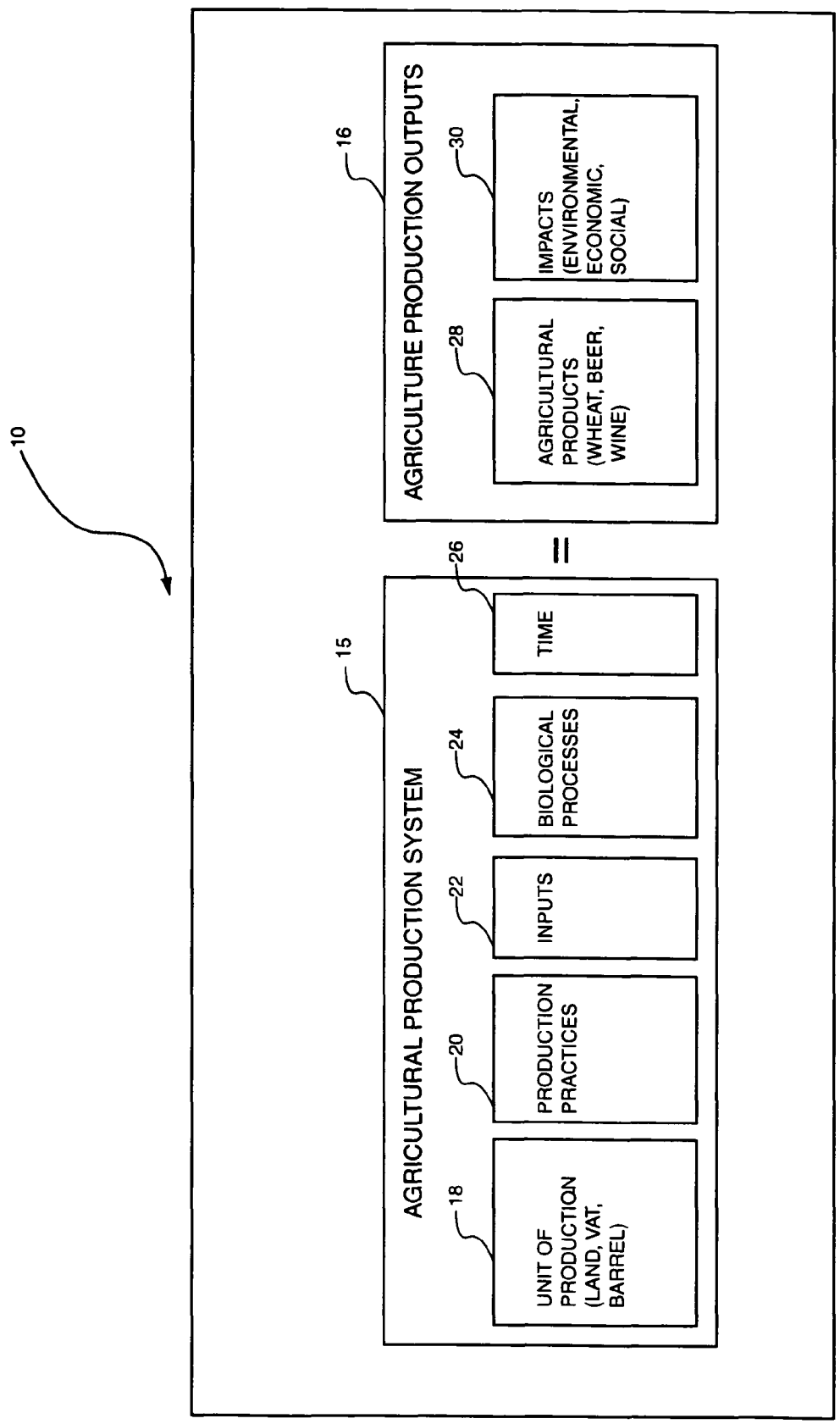
FIG. 1 is a diagrammatic representation of an exemplary agricultural system within which the present invention may be deployed.

FIG. 1 illustrates an exemplary agricultural system 10 that includes an agricultural production system 15 and agricultural production outputs 16. The production system 15 may in turn conceptually be viewed as including one or more components that contribute towards the agricultural production outputs 16. These components may include production units 18, production practices 20, inputs 22, biological processes 24, and time 26. The outputs 16 may include agricultural products 28 and impacts 30 on environmental, economic and social systems.

For the purposes of the present specification, agricultural systems 10 shall be taken to include, but not be limited to, land-based (e.g., cropland, grassland, pasture and range, forest land, plantations, hen-house, etc.), water-based (e.g., oceans, lakes, rivers, streams, ponds, tanks, etc.), fermentation (e.g., winemaking, brewing, baking, etc.), biochemical (e.g. extraction or biosynthesis of proteins, vitamins, minerals, amino acids, etc.), chemical (e.g., distilling, etc.) or other production processes and actions to prepare agricultural products for ingestion or use by a human, animal, or plant.

Agricultural products 28 may be taken to include, but not be limited to, grains, beans, vegetables, fruits, nuts, meats, poultry, eggs, fish, seafood, herbs, beverages, wine, beer, distilled spirits, flowers, nursery plants, proteins, amino acids, vitamins, minerals, nutraceuticals, nutritional supplements, medicines, plant and animal derived oils, cotton, fiber, paper, milk, cheese, breads, leather, and other processed products.

Units 18 may include, but not limited to, a specified unit of cropland (e.g., agricultural field), forest land (e.g., natural forest, managed forests, plantations, etc.), grassland pasture and range used by grazing animals, animal rearing and processing facilities (e.g., feed-lot, slaughter-house, hen-house, etc.), a defined fresh or salt water area where fish, seafood and other plants and animals are captured or otherwise collected (e.g., specified length of ocean-front coast, lake-front coast, lake, river, stream, pond, bay, open-ocean, lake, aquaculture tank, etc.), processing facility (e.g., fermentation plant, dehydration plant, mixing plant, distillery, kitchen, bakery, bottling plant, canning plant, etc.) or tank, barrel, vat, or other fermentation, biochemical, or chemical chambers. A unit may also be a biologically meaningful unit (e.g., an ecosystem, watershed, biological community, habitat, or species population range), a politically meaningful unit (e.g., a country, state, region, county, city, town, village or other voting unit) or a geographically meaningful unit (e.g., a section, township, and range).

The terms agricultural product processing or food processing mean herein any operation or action made to prepare an agricultural product 28 for ingestion or use by a human, animal, or plant.

The terms farm, ranch, forest operation, fishing operation, and processing facility include herein an agricultural production venture, enterprise, operation, location, site or other point of origin, wherein or whereby an agricultural, chemical or biochemical process is sponsored, effected or managed and that produces an agricultural product 28 that is meant to be, or is likely to occasionally be, used or ingested by a human, animal, or plant or is meant to be combined with other materials in subsequent processes or mixtures, whereafter one or more resultant products or derivative products of a subsequent process, are meant to be, or are likely to be occasionally be, used or ingested by a human, animal, or plant. The meaning of the terms farm, ranch, forest operation, fishing operation, and processing facility further include an agricultural production venture, enterprise, operation, location, site or other point of origin, wherein or whereby an agricultural product 28 that is meant to be, or is likely to occasionally be, used in a subsequent agricultural, industrial, chemical, biochemical or commercial process or manufacture, is generated or sponsored. Examples of a farm, ranch, forest operation, fishing operation, and processing facility include vineyards, wineries, orchards, vegetable garden's, vegetable farms, ranches, pig farms, chicken farms, meat packing plants, fish cannery, vegetable cannery, freezing facilities, drying facilities, bakery, extraction facilities, biosynthesis facilities, egg farms, fish hatcheries, aquaculture facilities, tree and plant nurseries, forests, plantations, and fresh water and salt water fishing areas and locations.

The term lot is defined as two or more agricultural products 28 that originate from the same unit of production 18. Further, agricultural products 28 of a lot may be harvested or processed in substantially the same way during substantially the same time period with substantially the same procedures and equipment. A unique alphanumeric identifier or other suitable designation known in the art is used to identify a lot. Examples of lots include, but are not limited to, two apples harvested from the same tree on the same field on the same day or during another designated time period, a volume or an amount of grapes harvested from a particular area of a specific vineyard during a certain time period, lettuce heads harvested from the same field during the same time period, a volume of wine fermented in a single barrel or vat, a volume of wine divided and placed into a plurality of bottles, canned fruit, vegetables, or meat manufactured on the same day or during another designated time period on the same assembly line, frozen fruit, vegetables, or meat manufactured on the same day or during another designated time period on the same assembly line.

Production practices 20 are practices employed, for example, by farm, ranch, forest operation, fishing operation, and processing facility managers to combine production units 18, inputs 22, biological processes 24, and time 26 to produce the agricultural products 28. Examples of production practices 20 may include, but are not limited to, crop residue management, cropping management, pest management, nutrient management, soil management, water management, human resource management, fermentation management, quality control management, biochemical process management, etc.

Inputs 22 may include but are not limited to production inputs (e.g., nutrients, pesticides, seeds, seedlings, bacterial strains, yeast strains, energy, machinery and other technologies, water, etc.), management inputs (e.g., farm managers, facility managers, boat or fleet managers, product line manager, quality control managers, pest managers, etc.), labor inputs (e.g., farm worker, ranch-hand, factory worker, production line worker, etc.), and capital inputs that are in any way used in the production of agricultural products 28.

Biological processes 24 include, but are not limited to biologically meaningful physical, chemical, biochemical, individual organism, population, community, watershed, ecosystem, and biosphere processes that influence in a positive or negative manner the production of agricultural products 28 and impacts 30. The biosphere is the largest biological unit and includes all parts of the earth where life exists. Several key nutrients and inorganic molecules essential for life cycle on a biosphere scale. Examples include the water cycle, nitrogen cycle, and carbon cycle. The term ecosystem refers to communities of interacting organisms and the physical environment in which they live. Example ecosystems include grassland, forest, freshwater, coastal, and agricultural. Ecosystem processes include such functions as air and water purification, evaporation, precipitation, soil production, soil erosion, climate control, ecosystem-level nutrient cycling, and the capture and flow of energy via food chains and food webs.

Ecosystems are composed of smaller biologically meaningful units including watersheds, communities, populations, and individual organisms. A watershed is a geographically defined area where water from streams, neighborhoods, agricultural areas, and rivers carries sediments and dissolved materials to a common outlet such as a wetland, estuary, lake, pond, sea or ocean. Communities are the assemblages of species populations that occur together in space and time. Species diversity, community biomass and productivity, succession, community-level nutrient cycling and energy flow, interspecific competition, decomposition, mutualism, predation, and parasitism are examples of community properties. Populations are composed of groups of actually or potentially interbreeding individuals at a given locality. Example population processes include reproduction, gene flow, intraspecific competition, and dispersal. Individual organism processes include growth, fitness, reproduction, maintenance, and survival. Biochemical processes include such examples as photosynthesis and metabolism.

Impacts 30 may include, but are not limited to, intended and unintended alternations to biological, economic and social processes and systems as a result of agricultural production system 15. The term biological impact is herein defined as an unintended or intended impact of agricultural production system 15 on biological processes and conditions. The agricultural production system 15 can have impacts on air, water, and land from pollutants (e.g., sediment, dust and other particulate matter, nutrients, pesticides and their breakdown products, other organic and inorganic chemicals, salts, pathogens, etc.) and use patterns (e.g., cultivation, deforestation, wetland drainage, burning, changes to water flows, etc.) that may alter physical, chemical, biochemical, individual organism, population, community, watershed, ecosystem, and biosphere processes. Example physical impacts include alternations to soil, water, or air temperatures, changes in light intensity on land or water surfaces, water turbidity, etc. Example chemical impacts include alternations to soil or water pH, percent dissolved oxygen in water, concentration of particulate matter in air, concentration of minerals (e.g., nitrogen, phosphorous, selenium, etc.) in soil or water, and contamination of soils or water by inorganic or organic pollutants (e.g., pesticides, fertilizers, pesticide-breakdown products, etc.). Examples of impacts on individual organisms include altered growth, fitness, reproduction, maintenance, and survival.

Examples of impacts on species populations include significant reduction in overall numbers (e.g., endangered or threatened species status), significant increases in overall numbers and range (e.g., invasive species), and alternation of population age, genetic structure and diversity. Examples of community impacts include alterations of species diversity and abundance (e.g., invasive species, loss of wild populations, etc.), changes in the structure and functioning of food chains and food webs, and changes in nutrient cycling and energy flows. Examples of ecosystem impacts include alternations in water quality, water quantity, water duration, and water seasonal timing, large-scale changes in species diversity and abundance, decreases in total biomass and productivity, and alternations in nutrient cycling and energy flow. Examples of biosphere impacts include alternations to the carbon cycle (e.g., increased carbon dioxide in the atmosphere), nitrogen cycle (e.g., increased nitrates in deep ground water) and global climate change.

The term economic impact is herein defined as an unintended or intended impact of an agricultural production system 15 not accounted for in the trade value or sale price of agricultural product 28. The term social impact is herein defined as an unintended or intended impact of an agricultural production system 15 on the health, safety, educational, and standard of living conditions and opportunities of individuals and communities and the treatment of animals. Example economic impacts resulting from agricultural production systems 15 include the individual, community, and government cost of additional water treatment to remove agricultural pollutes (e.g., sediments, nutrients, pesticides, pathogens, etc.), increased health care costs associated with pesticide poisonings, increased taxes to pay for air quality and water quality regulatory oversight and clean-up. Examples of social impacts that may result from agricultural production system 15 include poverty from low paying and season jobs, limited availability of affordable and safe housing, dangerous working conditions (e.g., exposure to pesticides), limited opportunities for education or training, decreased consumer confidence in safe and affordable agricultural products 28, inhumane treatment of animals, and increased regulatory oversight.

Figure 2:
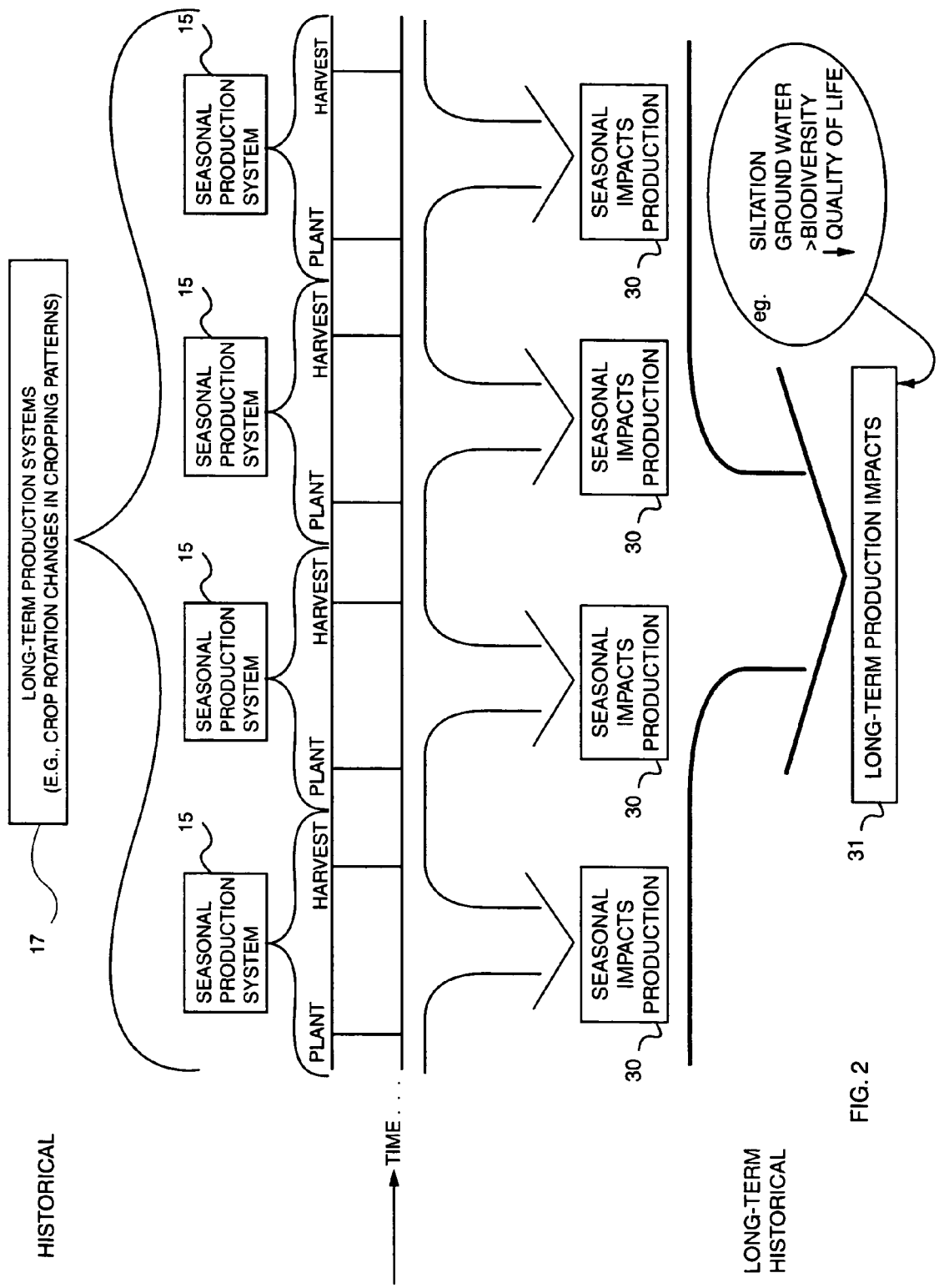
FIG. 2 is a diagrammatic illustration of how seasonal production systems can be managed as long-term production systems, and seasonal production systems may deliver seasonal production impacts and long-term productions impacts.

FIG. 2 illustrates how seasonal production systems 15 can be managed as long-term production systems 17 and seasonal production systems 15 deliver seasonal production impacts 30 and long-term production impacts 31. Examples of long term production systems 17 include crop rotation, changes in cropping patterns, etc. Examples of long term production impacts 31 include accumulated environmental, economic and social impacts such as siltation of water courses, groundwater pollution, decreases in biodiversity, and decreases in quality of life for individuals and communities.

Overview—Methodology

Figure 3:
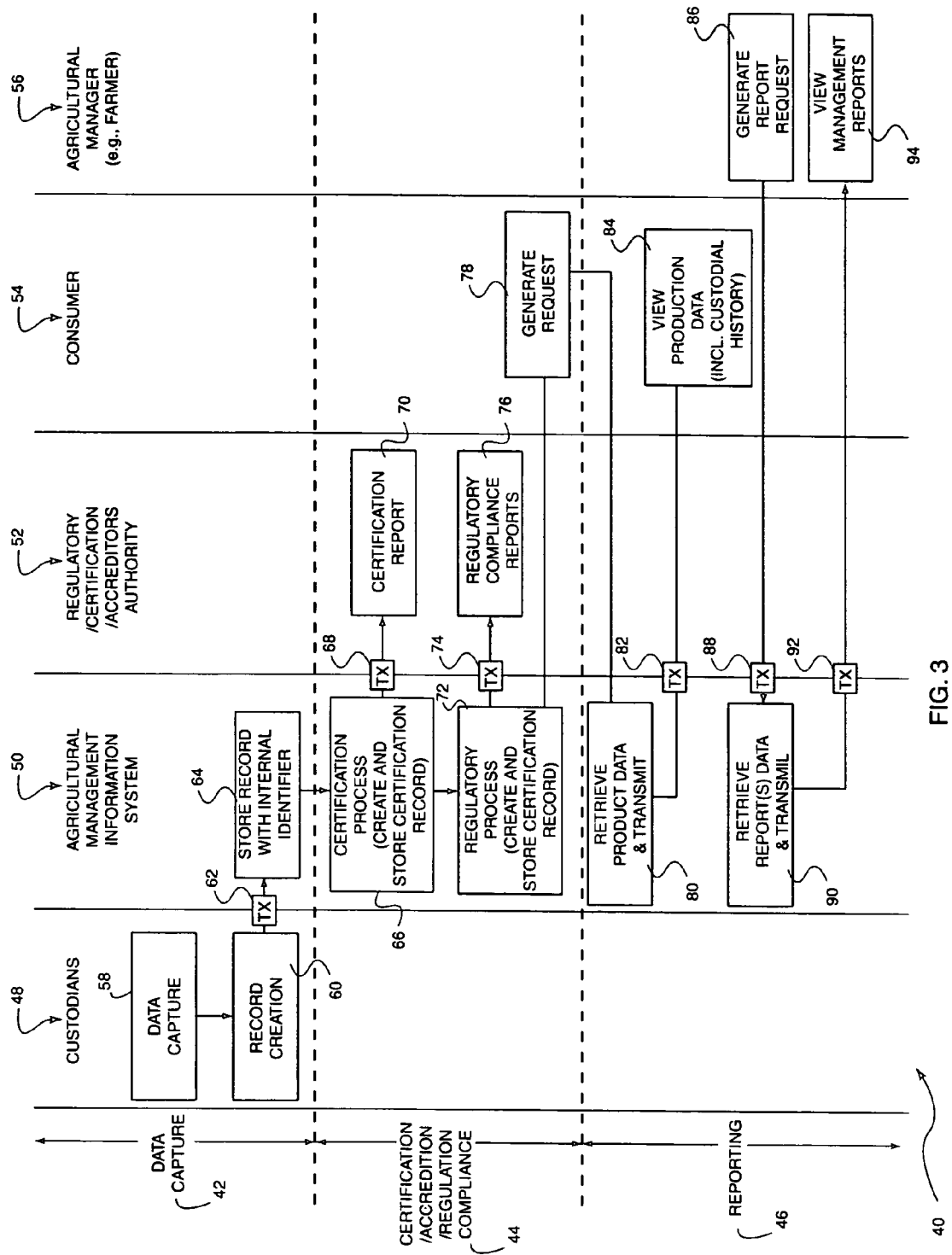
FIG. 3 is a flow chart providing an overview of a method, according to the present invention, of capturing, managing, processing and outputting data pertaining an agricultural product.

FIG. 3 is a flow chart providing an overview of an exemplary method 40 of capturing, managing, processing and outputting data pertaining to an agricultural product. At a high level, the method 40 may conceptually be viewed as composing a data capture and chain of custody record creation component 42, a certification/accreditation/compliance component 44 and a reporting component 46. Contributors, processors and users of the data concerning the agricultural product include custodians 48 of the agricultural product, an agricultural management information system 50, a regulatory/certification/accreditation authorities 52, consumers 54 of the agricultural product 28, and agricultural managers 56.

The method 40 commences at block 58 with the capture, by custodians 48 of an agricultural product 28, of product data pertaining to the agricultural product, the product data reflecting a condition pertaining to the product at a custodial location. In one embodiment, as will be described in further detail below, a series of custodians, each controlling a custodial location along a chain of custody, perform data capture operations to capture product data reflecting conditions pertaining to the product at each of the respective custodial locations.

At block 60, a data record is created by each custodian 48, the record embodying the product data captured at block 58.

At block 62, the created data record is communicated from a respective custodian 48 to the agricultural management information system 50 that, at block 62, proceeds to store the received data record together with an internal identifier 64.

At block 66, the agricultural management information system 50 performs a certification process to create and store a certification record indicating that a particular agricultural product, for which data has been received from one or more custodians 48, complies to one or more certification or accreditation standards specified by one or more certification or accreditation authorities. This certification record may, at block 68, be communicated to the relevant certification or accreditation authority, that, at block 70, may optionally generate a certification or accreditation report.

At block 72, the agricultural management information system 50 may optionally perform a regulatory compliance process to create and store a compliance record. At block 74, this compliance record may optionally be transmitted to a regulatory compliance authority that then generates, at block 76, a regulatory compliance report.

At block 78, a consumer 54 may generate a request for certain information regarding an agricultural product (e.g., whether the product complies with certain certification standards). As will be described in further detail below, this request may be inputted into a network communication device (e.g., a network-coupled personal computer) which is then communicated to the agricultural management information system 50.

At block 80, the agricultural management information system 50 retrieves data pertaining to one or more agricultural products identified in the consumer request and, at block 82, transmits the received data to the consumer 54 as a response to the initial request. At block 84, the consumer 54 may then view the product data including, for example, certification/accreditation/compliance information as well as custodial history information as derived from the data originally captured by the custodians 48 at block 58.

In a similar manner, at block 86, an agricultural manager 56 may generate a report request for a report pertaining to one or more agricultural products, this request being transmitted to the agricultural management information system 50 at block 88. At block 90, the agricultural management information system 50 retrieves one or more reports and other pertinent data and, at block 92, transmits the retrieved report data to the agricultural in manager 56. At block 94, the agricultural manager 56 is then able to view one or more management reports derived from the management data.

FIG. 3 provides a high-level overview of the method 40. Further details regarding each of the operations, as well as the systems underlying such operations, will now be discussed.

Data Capture and Chain of Custody

Figure 4:
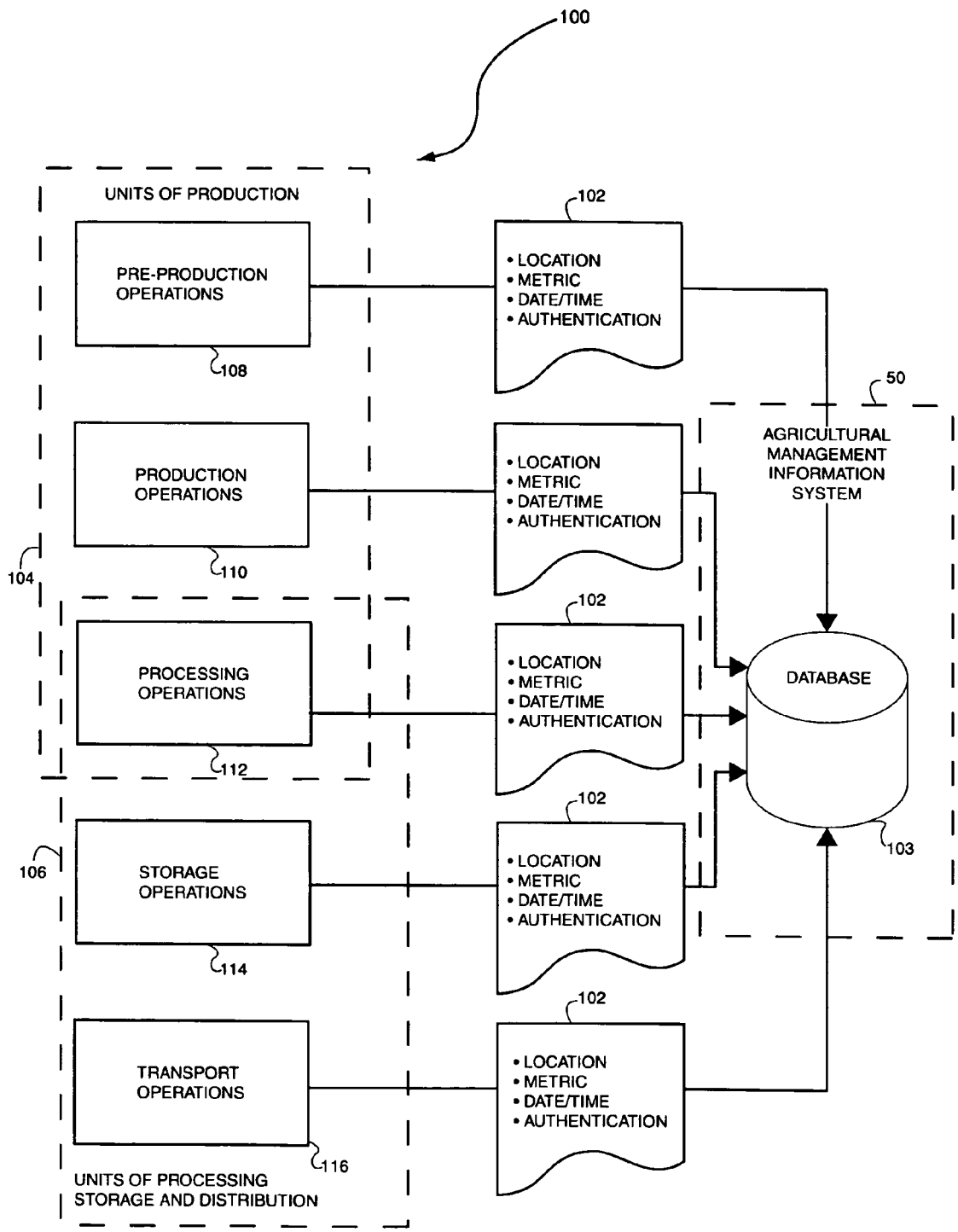
FIG. 4 is a diagrammatic representation of the capture of data at multiple units that together constitute a chain of custody, according to an exemplary embodiment of the present invention.

FIG. 4 is a diagrammatic representation of the exemplary capture of data at multiple units 100 that together constitute a chain of custody. The submission, by each of such units 100, to the agricultural management information system 50 for storage within a database 103, of records 102 that embody the captured data pertaining to the agricultural product. The units 100 may conceptually be viewed as comprising units of production 104, and units of processing, storage and distribution 106. Within the context of each unit, data may be captured regarding each of a number of operations to generate individual data records of product data reflecting conditions pertaining to a relevant agricultural product at a respective unit. For example, a unit of production 104, as defined above with reference to FIG. 1, may include pre-production operations 108, production operations 110 and processing operations 112. According to an exemplary embodiment of the present invention, data pertaining to agricultural products at the relevant unit of production 104 may be gathered as part of the operations 108-112 to compose the data records 102. The exemplary records 102 are shown to include location data to indicate the location of the relevant unit of production, measured data reflecting a measured or otherwise ascertained metric, time and date information, and authentication information.

Similarly, each of a number of units of processing, storage and distribution 106 may include combinations and permutations of processing operations 112, storage operations 114 and transport operations 116, agricultural product data being captured as part of such operations.

While the described operations are illustrated in FIG. 4 as being performed at various units, it will be appreciated that any permutation, variation or combination of the described operations may occur at any of the described units, and that the data capture need not necessarily be performed as part of the described operations.

By implementing the capture of product data at each of a chain of units that constitute a chain of custody of an agricultural product and the submission of such product data to the agricultural management information system 50, for example in the form of the records 102, it will be appreciated that the agricultural management information system 50 is able to provide a global view of a chain of custody and conditions pertaining to the agricultural product at each custodial location constituting the chain of custody.

Figure 5:
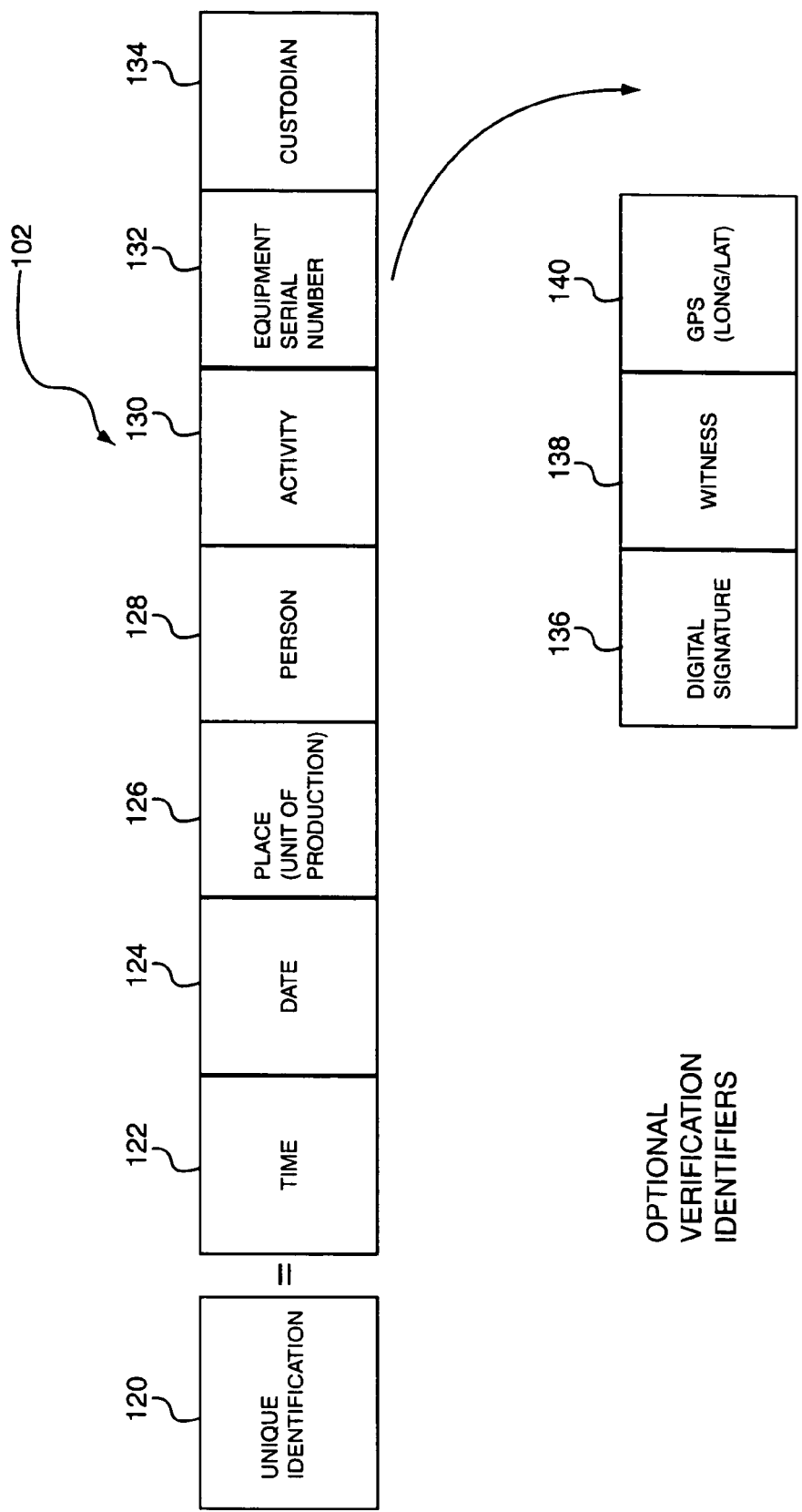
FIG. 5 is a diagrammatic representation of a data record, according to an exemplary embodiment of the present invention, that may be generated by a data capture device at each of the units of a chain of custody and thereafter communicated to the agricultural information system.

FIG. 5 is a diagrammatic representation of a data record 102, according to an exemplary embodiment of the present invention, that may be generated by a data capture device at each of the units 100 of a chain of custody and communicated to the agricultural management information system 50. In one embodiment, the record 102 may be constructed by the data capture device at the custodial location, and communicated to the agricultural management information system 50 as a record. In an alternative embodiment, the agricultural product data, as captured by the data capture device, may simply be communicated to the agricultural management information system 50, which then formats the received data as the record 102.

A unique identification field 120 stores, for each record, a unique identifier for the particular record that also serves to identify the relevant agricultural product for which the record 120 pertains. In one exemplary embodiment, a unique identifier for a record stored in a field 120 may comprise a Universal Product Code (UPC), or a derivative thereof.

A time field 122, for each record 102, stores a time at which the agricultural product data included within the record 102 was captured. A date field 124 similarly stores a date on which the relevant data was captured. A place field 126 stores location data indicating a location (e.g., any one of the units 100 discussed above with reference to FIG. 4) at which the agricultural product data was captured. In one embodiment, the data in the place field 126 indicates one of multiple custodial locations for a particular agricultural product.

A person field 128 stores an identifier for a person, or operator, at a custodial location who was responsible for the capture of the agricultural product data. An activity field 130 may store information identifying an activity (e.g., any one of the operations 108-116 described above with reference to FIG. 4) pertaining to the agricultural product and to which the captured data pertains. For example, an activity indicated in the activity field 130 may be the application of a fertilizer to a unit of production, the applying of the pesticide at a unit of production, the harvesting of an agricultural product, the packaging of an agricultural product, etc.

An equipment serial number field 132 stores an identifier for data capture equipment utilized in the capture of the data embodied within the record 102. For example, the equipment may comprise a hand-held device, examples of which are provided below. A custodian field 134 stores an identifier of a custodian 48 that operates or manages a particular custodial location in a chain of custody (e.g., a unit 100).

The record 102 may also include a number of optional verification identifiers. More specifically, a digital signature field 136 may store a digital signature utilized to encrypt the record 102 for secure and confidential transmission. A witness field 138 may include a digital witness identifier that provides a further level of authentication for the digital signature 138. A Global Positioning System (GPS) field 140 may include longitudinal and latitudinal location information, in one embodiment, to be utilized to authenticate place information stored within the place field 126. The contents of the GPS field 140 may also be utilized to enhance reports generated by the agricultural management information system 50, by providing a further level of detail regarding location of a custodial location.

Figure 6:
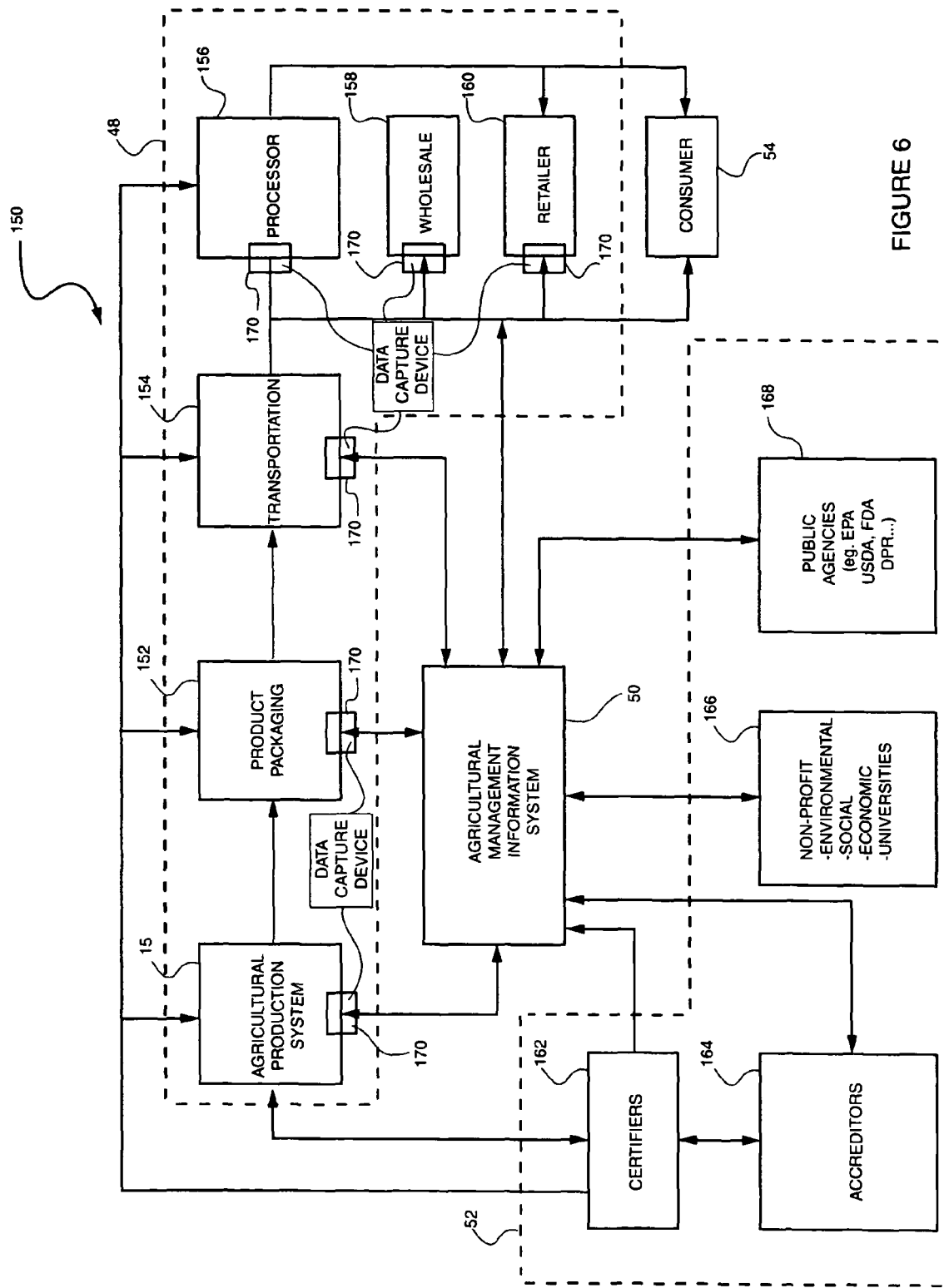
FIG. 6 is a block diagram illustrating a compliance and chain of custody system, according to an exemplary embodiment of the present, that includes a chain of custody constituted by a collection of custodians, each of which provides input to the agricultural management information system.

FIG. 6 is a block diagram illustrating a compliance and chain of custody system 150 that includes a chain of custody constituted by a collection of custodians 48, each of which provides input, for example in the form of a record 102, to the agricultural management information system 50. The system 150 is also shown to include a collection of regulatory/certification/accreditation authorities 52 that interact with the agricultural management information system 50 to at least partially automate regulatory compliance, certification or an accreditation processes. The exemplary custodians 48 include an agricultural production system 15, a packaging custodian 152, a transportation custodian 154, a processor custodian 156, a wholesale custodian 158 and a retail custodian 160. Outside the chain of custody, a consumer 54 is also shown to interact with the agricultural management information system 50.

Each of the custodians 48 is further shown to access one or more data capture devices 170 that are utilized to capture product data at the respective custodial locations 48. Each data capture device 170 is furthermore shown to be in communication with the agricultural management information system 50, so as to facilitate the communication of the captured product data from the data capture device 170 to the agricultural management information system 50.

A data capture device 170 utilized by a custodian 48 may be a hand-held device (e.g., a Personal Digital Assistant (PDA), a mobile telephone, or any other known hand-held device), or a fully-functional computer system (e.g., a desktop Personal Computer (PC) or a notebook computer system).

Further, as described in further detail below, the data capture device 170, according to an exemplary embodiment of the present invention, may be equipped to perform read and/or write operations of an external information source. In one embodiment, the data capture device 170 may be connectable to an external data source associated with a particular custodial location. In alternative embodiments, the data capture device 170 may be constructed to perform a wireless read of information associated with a custodial location utilizing any electromagnetic frequency communications (e.g., optical, infrared (IR) or radio frequency (RF) communications).

The agricultural management information system 50, as will be described in further detail below, comprises one or more applications executing on one or more computer systems, as well as one or more databases maintained on one or more data storage systems.

The data capture devices 170 communicate with the agricultural management information system 50 utilizing a communications network, such as the Internet, the Plain Old Telephone Service (POTS), cellular telephone networks, a Wide Area Network (WAN) or a Local Area Network (LAN).

A collection of authorities 52 are also shown to interact with the agricultural management information system 50. Such authorities 52 include, merely for example, a certification authority 162 (e.g., The Food Alliance, California Certified Organic Farmers, etc.), an accreditation authority 164 (Marine Stewardship Council, Forest Stewardship Council, etc.), a non-profit organization 166 (e.g., an environmental watchdog, social, economic organization, or universities), and federal, state, and local public agencies 168 (e.g., The US Environmental Protection Agency (EPA), The Food And Drug Agency (FDA), The US Department of Agriculture (USDA), California Department of Pesticide Regulation (DPR), etc.). The interaction of the authorities 52 with the agricultural management information system 50 will also be described in further detail below.

Data Capture

Further details regarding exemplary embodiments of the capture 42 of data concerning an agricultural product will now be described.

Figure 7:
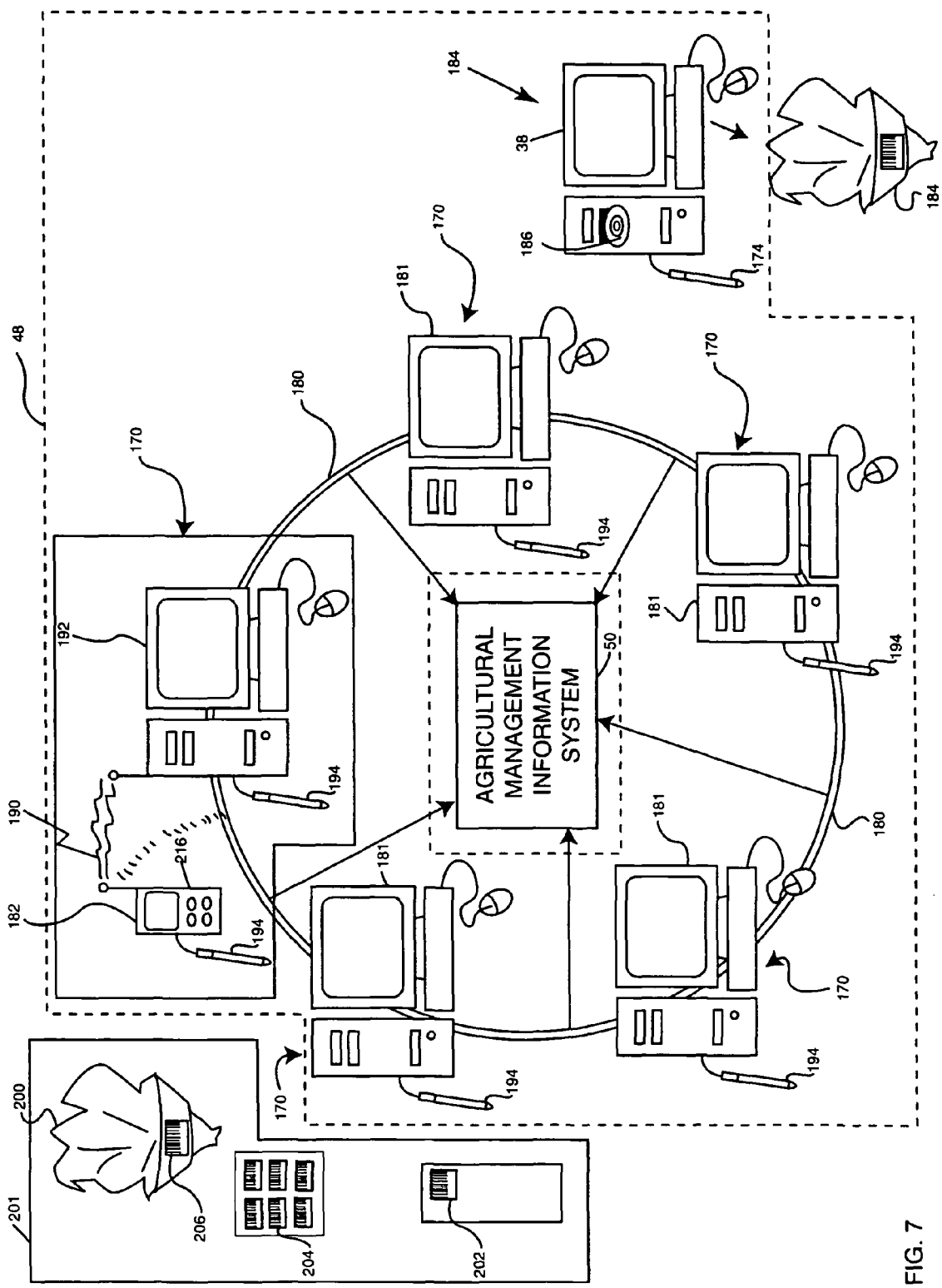
FIG. 7 is a diagrammatic representation illustrating a plurality of data capture devices, connected via a network to each other and to an agricultural management information system, according to an exemplary embodiment of the present invention.

FIG. 7 is a diagrammatic representation illustrating a plurality of data capture devices 170, connected via a network 180 (e.g., the Internet) to each other and to the agricultural management information system 50. Each of the data capture devices 170 is located at a respective custodial location 48 within a chain of custody to capture pertinent data. The data capture devices 170 also include a stand-alone computer system 184 that communicates agricultural product information on a data storage media 186 (e.g., a CD ROM or any other optical, magnetic or opto-magnetic storage medium) that is provided to the agricultural management information system 50. Accordingly, the computer system 184 is not required to be coupled to the network 180.

One of the data capture devices 170 is shown to comprise a hand-held device 182 that communicates utilizing radio-frequency communications 190 with a base computer system 192. The hand-held device 182 is also shown to communicate directly with the network 180 via radio-frequency communications 190. The hand-held device 182 is utilized by an operator conveniently to record data concerning an agricultural product at various locations within a chain of custody and production cycle through which the agricultural product proceeds. The hand-held device 182 may be utilized by any of the custodians 48, described above with reference to FIG. 6, at any one of the custodial locations 48. For example, farmers, transporters (e.g., truckers and railroad freight handlers) processors, distributors, retailers, insurers, marketers, resellers, regulatory agents, inspectors, environmentalists and any third party may utilize a hand-held device 182 to capture appropriate data.

The hand-held device 182, and also the computer systems 181, includes a data reader in the exemplary form of a barcode reader 194. An alternative embodiment of the present invention, the data reader may include any optical, infrared, radio frequency, magnetic or opto-magnetic reader or a network device before receiving communications or information via a network.

FIGS. 8A-8D are diagrams illustrating further details regarding the operation of an exemplary hand-held device 182, that receives input from a barcode reader 194. Data capture at an exemplary custodial location in the form of a production unit will now be described with reference to FIGS. 7 and 8A-8D.

Turning firstly to FIG. 7, the present invention proposes a method by which product data, reflecting a condition pertaining to an agricultural product, be associated with location data identifying a location within the chain of custody. Further, the present invention proposes that a product identifier may also be associated with the captured location and product data. Referring specifically to FIG. 7, at a specific custodial location 201, location data in the form of location code 202, encoded as a barcode, is shown to be physically associated with the custodial location 201. For example, as shown in more detail in FIG. 8B, the location code 202 may be printed on a weather-resistant tag 210 that is fixed to a physical structure in the exemplary form of a post 212 located at the custodial location 201. Accordingly, the post 212 may be positioned at a specific location at a custodial location 201 to provide a reference location for the capture of product data.

Figure 8B:
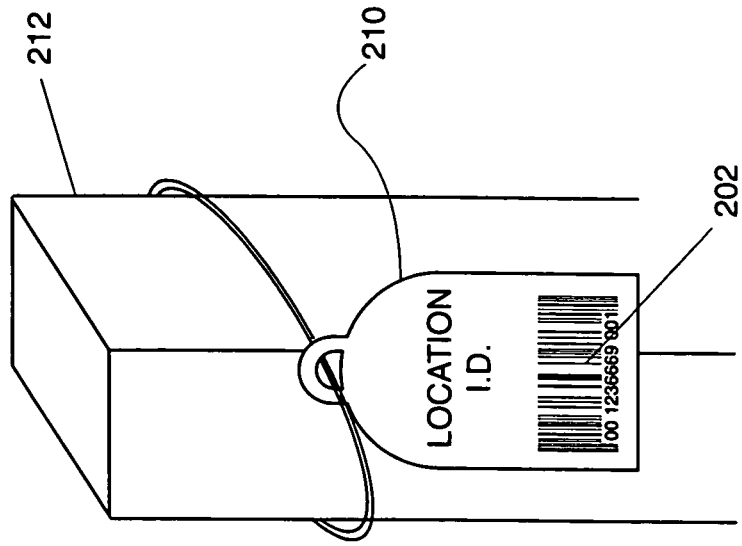
FIGS. 8A-8D are diagrams illustrating details regarding the operation of an exemplary hand-held device that includes a barcode reader.
Figure 8A:
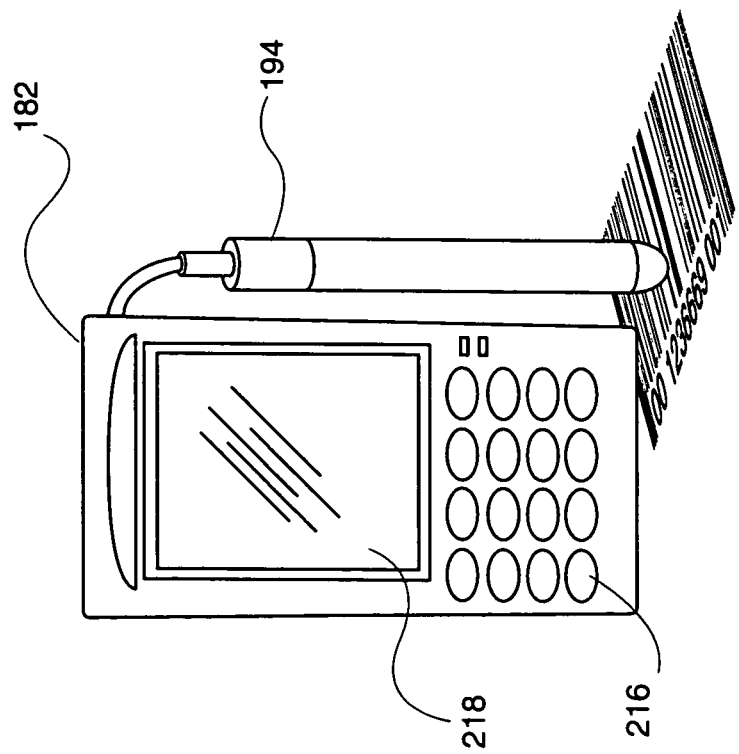
Figure 8C:
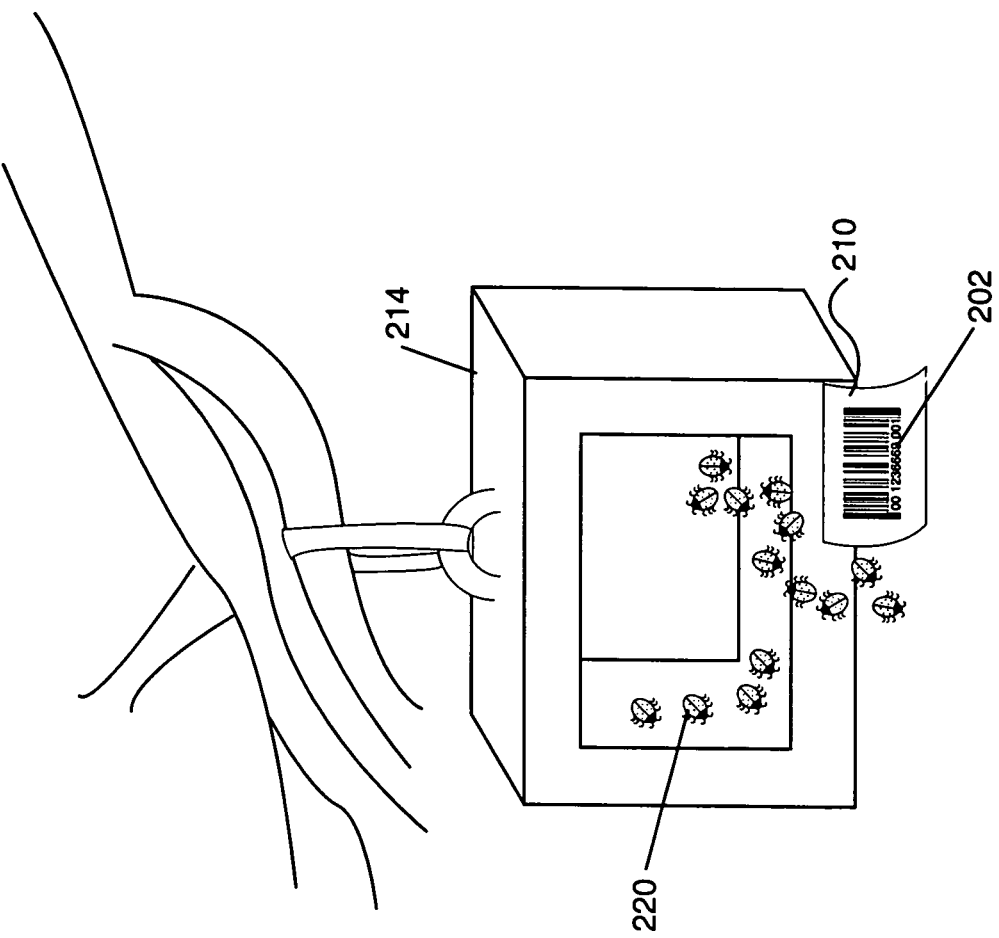

FIG. 8C illustrates an exemplary situation in which a tag 210, on which the location code 202 is again represented in the form of a barcode, is attached to an insect trap 214.

It will be appreciated that, utilizing the barcode reader 194, the hand-held device 182 may be utilized conveniently and reliably to capture a location code 202 from a location identifier (e.g., the tag 210) that is physically associated with a custodial location 201 by being attached to a post or trap, or being otherwise secured at the custodial location 201.

Having captured location data utilizing the hand-held device 182, the present invention proposes allowing a custodian 48 to capture product data, reflecting a condition pertaining to an agricultural product, at the relevant custodial location 201. To this end, FIG. 8A shows the hand-held device 182 to include a keypad 216 via which a custodian 48 may enter product data reflecting a condition pertaining to the product at the first location identified by the relevant location code 202. For example, with reference to FIG. 8C, a display screen 218 of the hand-held device 182 may present a user interface via which, utilizing the keypad 216, or touch-sensitive functionality provided by the screen 218 itself, the custodian 48 may enter an indication of the number of bugs 220 captured in the trap 214 at a particular time. It will be appreciated that, within different environments and at different custodial locations 201, a wide variety of agricultural product data may be captured. Accordingly, a wide variety of data capture applications may be executed by the data capture device (e.g., the hand-held device 182) to prompt a custodian 48 for appropriate data in a convenient and reliable manner. Such prompting may occur via a user interface presented on the display screen 218. The data input may be via the keypad 216, or via a touch screen functionality.

Figure 8D:
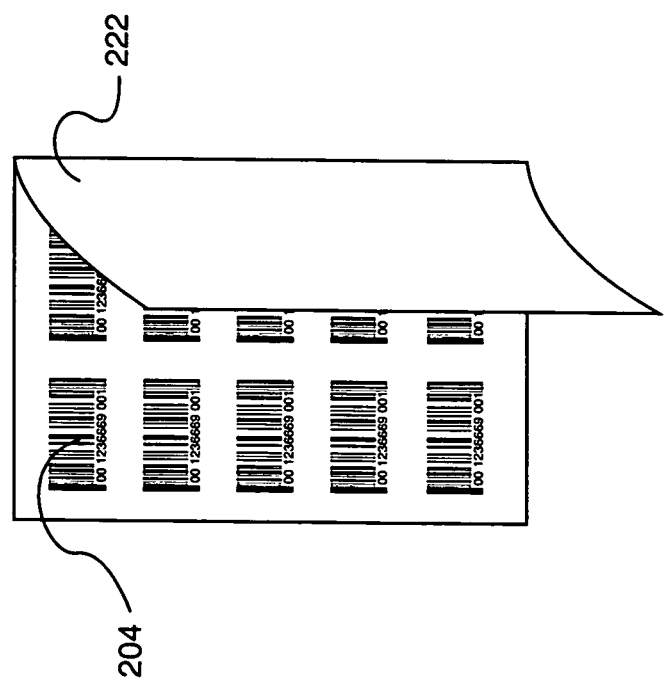
Figure 8E:
FIG. 8E illustrates an exemplary chart on which may be printed a collection of barcodes, each of which represents product data that may be ready by a barcode reader.
Figure 8E:
Figure 8E:
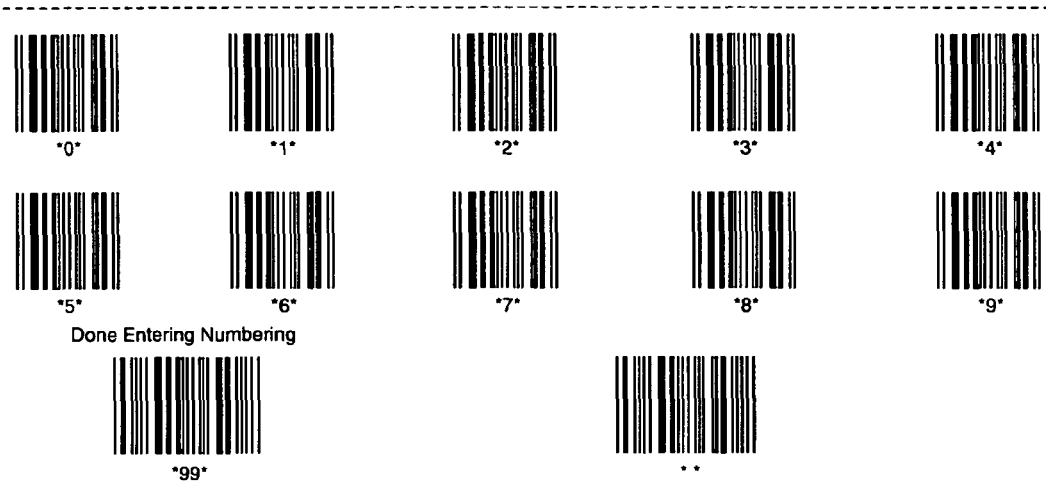
Figure 8E:
Figure 8E:
Figure 8E:

In a further alternative embodiment, referring to FIG. 8D, a particular custodian 48 may be provided with a chart 222, or handbook, of barcodes, each barcode embodying a product data code 204 that is associated with a particular chart 222. For example, each product data code 204 contained within a particular chart 222 may reflect a unique condition that is observable or determinable by a custodian 48. For example, a product data code 204 may reflect an observed condition pertaining to an agricultural product at a custodial location identified by the location code 202. It will be appreciated that a wide variety of conditions may be of interest from an agricultural management perspective, and any one of these conditions may be associated with a particular product data code 204. FIG. 8E illustrates an exemplary chart 222 on which are printed a collection of barcodes. The collection of barcodes includes product data codes 204 that in the illustrated embodiment provide product data in the form of a numeric count of pests that may be observed within a trap 214, such as that illustrated in FIG. 8C. Utilizing a barcode reader 194, such as that illustrated in FIG. 8A, a custodian 48 may conveniently input a numeric value to a hand-held device 182. It will readily be appreciated that by selecting a sequence of the product data codes 204, any numeric value may conveniently be entered into a hand-held device 182.

In addition to the product data codes 204, the chart 222 includes examples of location/data type codes 205, each of which indicates both a data type (e.g., leafhopper count, mite count, thrips count, mildew levels) and a particular location at which the relevant data type was captured (e.g., the northwest, northeast, southwest or southeast region of a unit or production). Utilizing the location/data type codes 205, a custodian 48 is conveniently able, by performing a single read of a code 205, to input both location and data type information to a hand-held device 182, whereafter a count, that comprises the indicated data type, may be entered utilizing the product data codes 204.

It will of course be appreciated that, in alternative embodiments, the location and data type codes may be distinct. For example, the chart 222 may contain a first set of data type codes (e.g., leafhopper, mite, thrips, mildew), a second set of location codes (e.g., northwest, northeast, southwest and southeast) and a third set of product data codes 204. In this embodiment, it will be appreciated, the number of barcodes printed on a chart 222 may be advantageously reduced. However, it will be appreciated that data input would, utilizing this embodiment, require the input of three codes, as opposed to the two codes that are advantageously required for a complete input utilizing the chart 222 illustrated in FIG. 8E.

The chart 222 is also shown to include a collection of command codes 207 utilizing which a custodian 48 may conveniently input commands (e.g., "done with vineyard") into a hand-held device 182. It will be appreciated that any number of commands, applicable to a particular application or environment, may appear on a chart 222.

Having captured the location data (e.g., the location code 202) and the product data (e.g., the product data code 204), a custodian 48 may where appropriate and possible capture product identification data as embodied within a product identification code 206 (e.g., a Universal Product Code (UPC)) embodied within a barcode associated with a particular agricultural in product as illustrated in FIG. 7. It will be appreciated that a product identification code 206 may not be associated with an individual product at all locations along a chain of custody, and may only become associated with an individual product and during a packaging stage. For example, at a unit of production 18 (e.g., a farm unit producing thousands of lettuce heads), a product identification code 206 is not associated with each individual agricultural product. However, at a downstream packaging custodian 152, such product identification codes 206 may be associated with each individual agricultural product.

In one embodiment of the present invention, the record 102 described above with reference to FIG. 5 is composed by the hand-held device 182. In an alternative embodiment, the information to compose the record 102 is communicated from the hand-held device 182 to a computer system 181, that composes the record 102. In a further embodiment, the information captured by the hand-held device 182 is simply relayed via the computer system 181 to the agricultural management information system 50 that then composes the record 102. In a further embodiment, the information captured by the hand-held device 182 is communicated via wireless transmission directly to the agricultural management information system 50 that then composes the record 102. In any event, it will be appreciated that, to compose the record 102, information types to populate the various fields, should be captured. Accordingly, the hand-held device 182 is required to capture information to populate the fields of the record 102, either automatically or by prompting input of the appropriate data. While the capture of the data for the record 102 is described as being performed by the hand-held device 182 above and below, it will be appreciated that the information could similarly be captured by any of the computer systems 181 illustrated in FIG. 7 to which a reader (e.g., a barcode reader 194), may be attached, and into which information may be inputted via a keyboard or a cursor control device, responsive to prompting presented on a display screen of the computer screen 181. However, for the purposes of illustration, the description herein shall be limited to data captured via the hand-held device 182.

Figure 9:
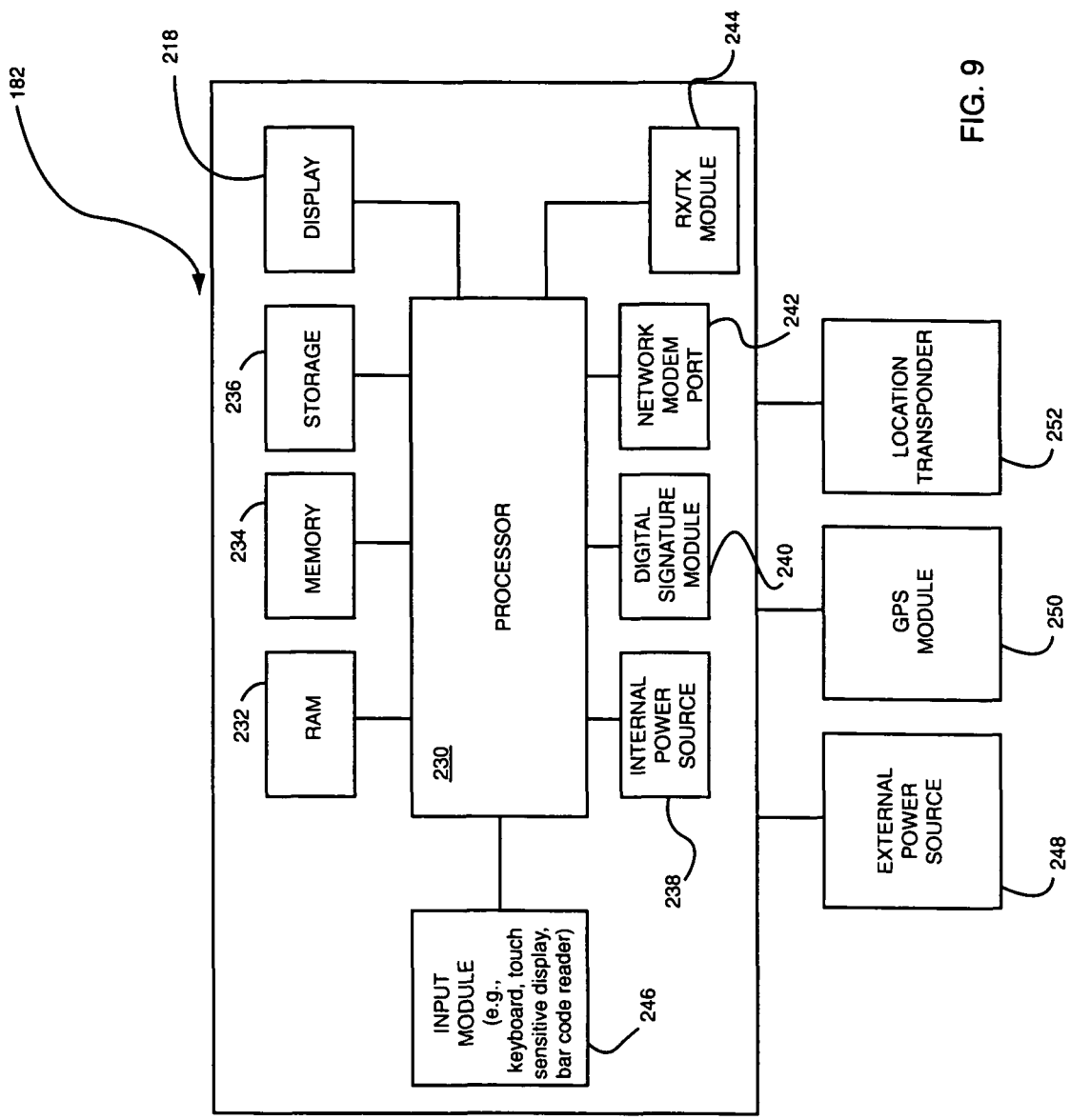
FIG. 9 is a block diagram illustrating the hardware components of a hand-held device, according to an exemplary embodiment of the present invention.

FIG. 9 is a block diagram illustrating the hardware components of the hand-held device 182, according to an exemplary embodiment of the present invention. A processor 230 is coupled via buses to a Random Access Memory (RAM) 232, a static memory 234 and a storage device 236 (e.g., a disk drive or flash memory device). The display screen 218 also receives signals from the processor to generate a display (e.g., a user interface to receive agricultural product data).

The hand-held device 182 is powered by an internal power source 238 (e.g., batteries), and also has a digital signature module 240 to store a digital signature that uniquely identifies the hand-held device 182. A network modem or port 242 (e.g., a USB or FireWire port) allows the hand-held device 182 to be coupled to a network. A receive/transmit module 244 enables the hand-held device to transmit and receive optical (e.g., infrared), radio frequency or any other electromagnetic frequency signals.

The hand-held device 182 is also shown to include at least one input module 246 via which a custodian may input data into the hand-held device 182. The input module may comprise the keypad 216, a touch-screen capability associated with the display 218, a voice recorder, a video recorder, an optical code recognition (OCR) module or radio frequency module associated with the receive/transmit module 244, the barcode reader 194 or any other hardware module that facilitates the input of data into the hand-held device 182.

An external power source 248 may also be utilized to provide power to the hand-held device 182. An optional GPS module 250 may provide longitudinal and latitudinal position information to the hand-held device 182. In an alternative embodiment, the hand-held device 182 may include a relative position system (e.g., a three-point transponder) that detects the location of the hand-held device 182 relative to a base unit (e.g., associated with the computer system 192), the base computer system 192 including a GPS module. By combining the relative positioning information received from the hand-held device 182 with the location information derived by a GPS module of the base computer system 192, position information for the hand-held device 182 may be derived.

Figure 10:
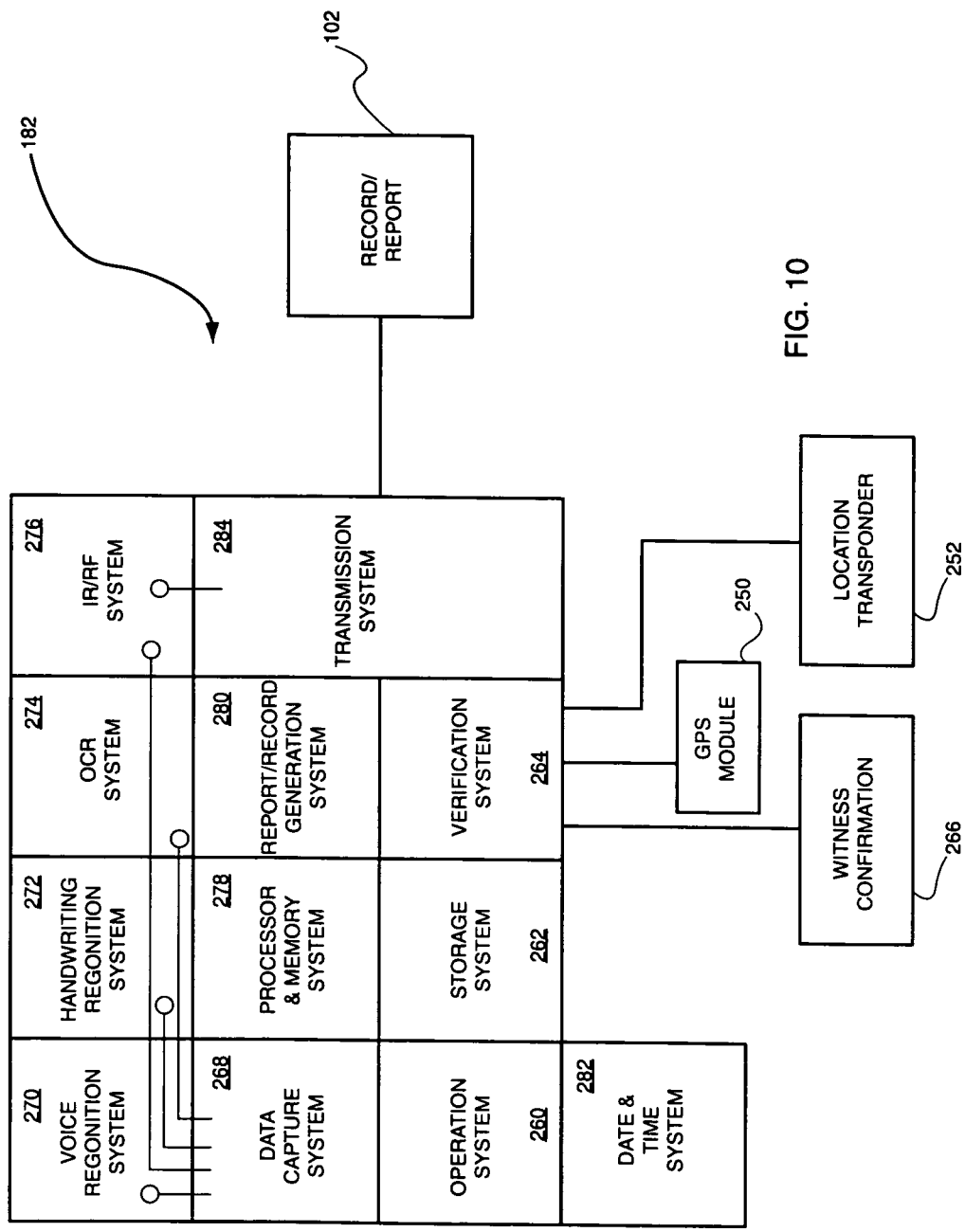
FIG. 10 is a block diagram illustrating system components implemented, for example, in software within a hand-held device.

FIG. 10 is a block diagram illustrating system components implemented, for example, in software within the hand-held device 182. The hand-held device 182 is shown to include a number of subsystems, including an operating system 260, a storage system 262 that controls the RAM 232, the static memory 234 and the storage device 236, and a verification system 264 that verifies data inputted into the hand-held device 182 via the input modules 246. Specifically, the verification system 264 may verify location data, as represented by a location code 202, inputted via the barcode reader 194. To this end, the verification system 264 may receive input from the GPS module 250 or location transponder 252. Further, the verification system 264 may operate to verify the authenticity and trustworthiness of the inputted data by receiving a witness confirmation 266 of the inputted data. In this embodiment, a witness with a unique identifier 138 confirms some or all data captured by the operator of the hand-held device 182 and adds a unique witness identifier 138 to the captured data or data report 102 prior to transmission to the agricultural management information system 50. Such witnesses may include a second custodian, certification agent, accreditation agent, third-party representative, or government agent. A data capture system 268 controls the one or more input modules 246, and may interface with a number of specific subsystems, namely a voice recognition system 270, a handwriting recognition system 272, an OCR system 274 and a IR or RF system 276. Any one of the systems 270-276 may be dedicated at the controlling of a specific input module 246. A processor and memory system 278 operates to control the processor 230 and the memory 234.

A report generation system 280, in one embodiment, operates to generate a report or record from the data received from the data capture system 268, as well as data retrieved internally from other systems and subsystems of the hand-held device 182. To this end, a date and time system 282 provides date and time information to the report generation system 280. Further, the storage device 236, in one embodiment, stores identification information identifying a person (or process) that is responsible for the input of the data via the one or more input modules 246 and also that stores an equipment serial number associated with the hand-held device.

A transmission system 284 is responsible for operating the network modem/port 242 and the receive/transmit module 244 to facilitate the output of information from the hand-held device 182. In one embodiment, the transmission system 284 may transmit captured data utilizing RF communications to a base computer system 192 that then, via the Internet, communicates this data to the agricultural management information system 50. In an alternative embodiment, the hand-held device 182 may be physically coupled to the base computer system 192 in order to transfer information to the base computer system 192 for propagation to the agricultural management information system 50. In yet a further embodiment, the hand-held device 182 may be coupled directly to the Internet, and may itself communicate the captured data to the agricultural management information system 50.

Data Capture—Methodology

Figure 11:
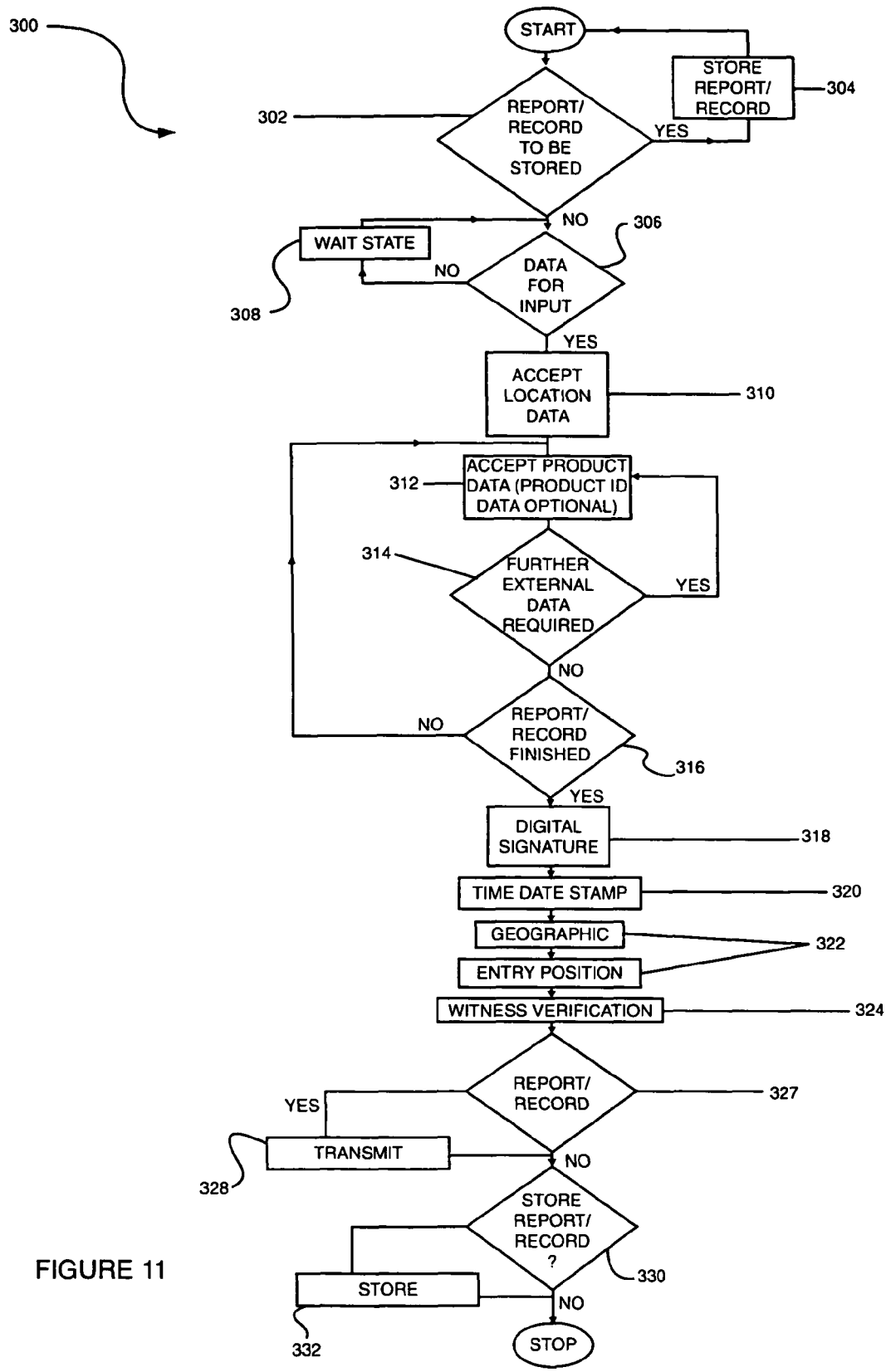
FIG. 11 is a flow chart illustrating a method, according to an exemplary embodiment of the present invention, of capturing data pertaining to an agricultural product.

FIG. 11 is a flow chart illustrating a method 300, according to an exemplary embodiment of the present invention, of capturing data pertaining to an agricultural product. The method 300 commences at decision block 302, with the determination as to whether a record or report generated by the report/record generation system 280, and composed of the previously captured data pertaining to an agriculture product, is to be stored. If so, at block 304, the report, or record, is stored. Following a negative determination at decision block 302, at decision block 306, a determination is made as to whether input data has been received via one of the input modules 246 of the hand-held device. If not, a wait state is entered at block 308.

On the other hand, if input data is detected at decision block 306, at block 310 the hand-held device accepts location data in the form, for example, of a location code captured from a location identifier (e.g., a tag 210 or a chart 222 having a printed barcode thereon). Alternatively, the location data may be automatically determined utilizing OCR technology, with a location code composing a numeric sequence read from a location identifier In yet another alternative embodiment, a location code may be embedded in a transponder that is activated by the hand-held device 182, so the location code is communicated as a radio frequency communication from the transponder to an appropriate receiver embedded within the hand-held device 182.

It will of course be appreciated that the location data can be communicated to the hand-held device 182 in any one of a number of ways from media on which the location data is stored in such a way as to be physically associated with a location identified by the location data. By obtaining the location data from media that is physically associated with the relevant location, the integrity of this information and the reliability of the capture operation, may be increased. Furthermore, the convenience to a custodian 48 performing the location data capture is increased. By having the location data appear, or be stored, on a media at the relevant custodial location, a relatively low-tech and cost effective system for capturing the location data is provided.

At block 312, the hand-held device 182 accepts agricultural product data, for example in the form of a product data code 204 as describe with reference to FIGS. 8D and 8E. Alternatively, the product data may be inputted into the hand-held device via the keypad 216 or a touch- (or pressure) sensitive display 218. At block 312, product identification data 206, as described above with reference to FIG. 7, may also optionally be inputted if such information is available.

At decision block 314, a determination is made as to whether further external data input is required in order to complete a report or record to which the hand-held device 182 contributes. If so, the method 300 loops back to block 312 to receive further data. If not, at decision block 316, the method 300 again loops back to block 312. Alternatively, if the collection of information by the device 182 is deemed to be finished at decision block 316, at block 318 the device 182 may append a digital signature to the data, at block 320 append time and date information to the captured data, at block 322 include a geographic position reference, such as a GPS value or other suitable geographic positioning identifier, to the data, and at block 324 append witness information to the data. It should be noted that the addition to the data of the digital signature, time and date stamp, geographic position reference and witness verification may optionally be performed, and serves to enhance the perceived credibility of the information as entered a custodian. Further, this optional data may serve to address or satisfy a certain regulatory, accreditation, or certification requirements.

At decision block 327, a determination is made as to whether the report/record is to be transmitted. If so, a transmission occurs at block 328.

At decision block 330, a determination is made as to whether the record/report is to be stored. If so, a storage operation occurs at block 332.

The acceptance of the location and product data at blocks 310 and 312, as previously noted, may be through an optical, radio frequency, infrared, video, or audio signal read operation of an appropriate code. For example, a product or data code may be stored in a one, two or multi-dimensional barcode. Alternatively, a product or data code may be stored within a transponder, or by a radio frequency transmitter that communicates utilizing, for example, the BlueTooth protocol. In yet a further exemplary embodiment, a location or data code may be encoded as an audio signal.

The product data captured at block 312 may comprise any data pertaining to an agricultural product. For example, the product data may be environmental data, indicating environmental conditions associated with an agricultural product. Such environmental data may, for example, reflect growing environment and conditions (e.g., soil nutrient levels, atmospheric conditions, pesticide application, etc.). Environmental data may also include conditions such as water, air and land quality adjacent to the unit of production 18. Environmental data may further comprise the health and status of species populations, a community, watershed, and ecosystem associated with the unit of production 18. The product data may also include characteristic data indicating a specific characteristic of an agricultural product. For example, such characteristic data may indicate the size, weight, calorie, color, brix, or other observable or measurable characteristic of an agricultural product. The product data may also comprise activity data recording details of an activity performed with respect to an agricultural product. For example, the activity data may reflect the timing and volume of pesticides applied at a particular unit of production 18. The activity data could also reflect data concerning any processing, distributing, packing, treating or handling of the agriculture product at any one of the custodial locations discussed above.

The product data may furthermore include economic data indicating costs of production associated with an agricultural product (e.g., material, water, energy, equipment, management, land, capital, and labor costs). Further, labor (or personnel) data may be captured at block 312 to identify personnel that contributed toward the production or processing of the agricultural product. Such personnel or data may include personnel identification, labor location and labor time, merely for example.

It should also be noted that the product data captured at block 312 may comprise audio or video data that is captured into a portable data capture device (e.g., an audio cassette recorder or a video recorder). Such captured audio or video may be digitized, and stored by the agricultural management information system 50 as part of the record 102.

Chain of Custody—Database

Figure 12:
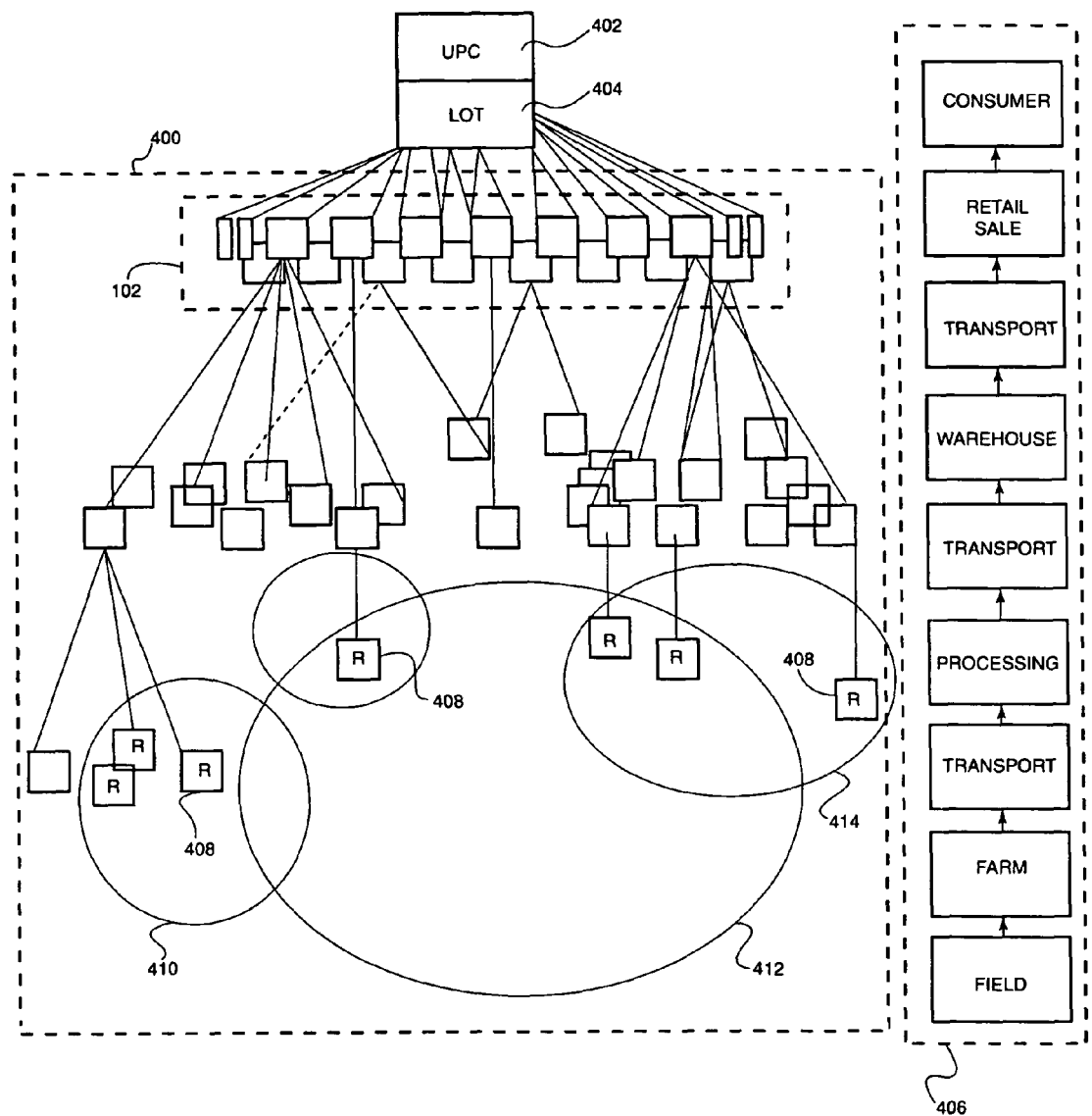
FIG. 12 is a block diagram illustrating an exemplary collection of data records that may be maintained within a database in an agricultural management information system.

FIG. 12 is a block diagram illustrating an exemplary collection 400 of data records 102 that may be maintained within the database 103 of the agricultural management information system 50. FIG. 12 also illustrates that the collection 400 of records 102 may be indexed by a common product code (e.g., a Universal Product Code (UPC) 402 or a lot code 404). Specifically, the UPC 402 or the lot code 404 may comprise the unique identifier 120 of an agricultural product data record 102, as illustrated in FIG. 5. Each of the records 102 may be linked to further records and reports pertaining to a specific agricultural product, or agricultural product lot, so that a hierarchical data structure of records and reports that comprises the collection 400 is defined. An exemplary chain of custody 406 for an agricultural product is also illustrated in FIG. 12.

In addition to records 102 that are generated at various custodial locations along the chain of custody 406, the collection 400 may also include reports 408 for various authorities (e.g., regulatory, accreditation, certification). For example, a first set of reports 410 may be generated for an organic certification authority based on information contained in the records. A further set of records 412 may be generated for a non-profit watchdog organization, and yet another set of reports 414 generated for a regulatory authority (e.g., the EPA). Each of the reports 408 may furthermore have one or more lot codes 404 and one or more UPCs 402 associated therewith. The generation of the exemplary reports 408 will be described in further detail below.

Architecture—Agricultural Management Information System 50

Figure 13:
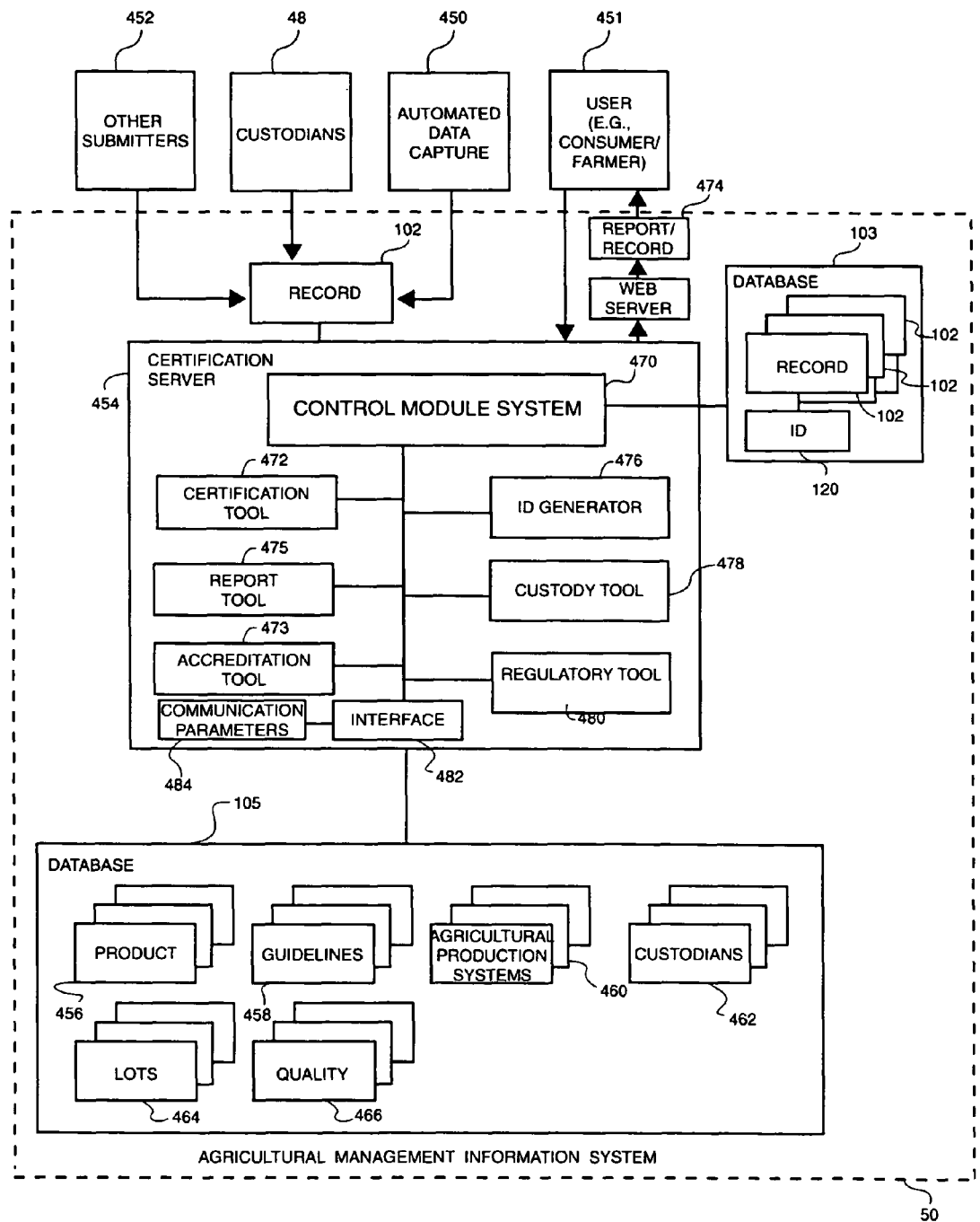
FIG. 13 is a block diagram illustrating further architectural details of an agricultural management information system, according to an exemplary embodiment of the present invention.

FIG. 13 is a block diagram illustrating further architectural details of the agricultural management information system 50, according to an exemplary embodiment of the present invention. The agricultural management information system 50 is shown to receive data records 102, including at least location and product data, from custodians 48, automated data capture mechanisms 450, and other submitters 452. In an alternative embodiment, raw data may be received at the agricultural management information system 50, which then itself composes the record 102.

The agricultural management information system 50 is shown to include a certification server 454 that is responsible for generating reports utilizing records, pertaining to an agricultural product, obtained from custodial locations constituting a chain of custody for the relevant agricultural product. To this end, FIG. 13 illustrates a first database 103 storing a collection of records 102, each of the multiple records 102 being associated with a unique identifier 120, which may comprise a UPC, lot number, or combination of UPC and lot number. Accordingly, a one-to-many mapping between the unique identifier 120 and multiple records 102 is maintained.

The certification server 454 also has access to a second database 105, which is shown to include product records 456 that include detailed information regarding agricultural products, guideline records 458 (e.g. organic certification guidelines, Marine Stewardship Council accreditation guidelines, EPA Clean Water Act standards, etc.), agricultural production system records 460 that include details regarding agricultural production systems 15 (e.g., such as those described with reference to FIG. 1), custodian records 462 that contain records regarding various custodians in a chain of custody, lot records 464 that may contain additional information regarding a lot of agricultural products, and quality records 466 (e.g., size, color, purity, brix level, harvest date, etc.).

In summary, the certification server 454 receives raw data, or unprocessed records 102, from the various submitters, and outputs a processed record 102 that is expanded to include further information derived from the above mentioned tables 456-468 of the database 105 and information that is generated by the certification server 454 itself.

The certification server 454 includes a control module system 470 that is responsible for coordinating the functioning of the various components of the certification server 454. These components include a certification tool 472 that is responsible for automatically generating a compliance result based on the automatic comparison of product data, embodied in a record 102, with compliance requirements as specified in a particular guideline record 458. In one embodiment, the certification tool 472 may functionally operate to certify a particular product, identified by a UPC and/or a lot number, as complying with certification guidelines, as described in a guidelines record 458, for any one of multiple certification authorities. Merely for example, The Food Alliance has issued a set of guidelines entitled "Commodity Specific Guidelines for Wine Grapes in the Pacific Northwest", these guidelines specify cultural practices (e.g., cover crops, adjacent area management, stock selection, harvest and storage practices), crop nutrition guidelines (e.g., fertilizer applications and soil pH levels) insect/mite management guidelines, disease/nematodes management guidelines, and weed management guidelines that should be complied with in order to receive a wine grape certification from The Food Alliance. Similarly, the Conservation Agriculture Network has issued a banana standard entitled "Complete Standards for Banana Certification", which specifies ecosystem conservation, wildlife conservation, fair treatment and good conditions for workers, community relations, agro-chemical management, waste management, water resource conservation, soil conservation and environmental planning and monitoring requirements that must be complied with in order to receive an appropriate certification from the Conservation Agriculture Network. Again, the compliance requirements for the above standards and guidelines may be embodied within one or more records within the guideline records 458 of the database 105. The certification tool 472 operates automatically to compare agricultural product data, in the form of the records 102, against the compliance requirements specified within such guidelines or standards, and to generate a compliance result based on this automatic comparison. The compliance result typically comprises a report 474, which the certification server 454 may report to a user 451. For example, the report 474 may be generated in real-time responsive to an inquiry from the user 451. Alternatively, the report 474 may be generated once sufficient agricultural product data has been collected from the various submitters, and the report 474 may then be stored as part of the record 102 and accessed at any time.

The certification server 454 also includes a report tool 475 that operates to generate custom reports (e.g., daily, seasonal or yearly pest management reports) based on the agricultural product data received from various submitters. Further details regarding the report in process will be provided below.

An identification generator 476 operates to generate the unique identifier 120 which may be associated with multiple records within the database 103 of the system 50. As described above, the unique identifier may be a UPC, a lot number, or the combination thereof (e.g., an encrypted identifier).

A custody tool 478 operates to include further custodial information within a record 102, as extracted from the custodian records 462.

A regulatory tool 480 operates substantially in the same way discussed above with respect to the certification tool 472, but instead operates to generate a regulatory compliance certificate as a compliance result based on the comparison of the agricultural product data against regulatory compliance requirements as specified in one or more guideline records 458. An accreditation tool 473 operates substantially in the same way discussed above.

An interface 482, that accesses communication parameters 484, facilitates access to the database 105. For example, the interface 482 may be implemented by a Database Management System (DBMS) so as to enable the control module system 470 to issue secure queries against the database 103.

Methodology—Creation of Compliance Result

Figure 14:
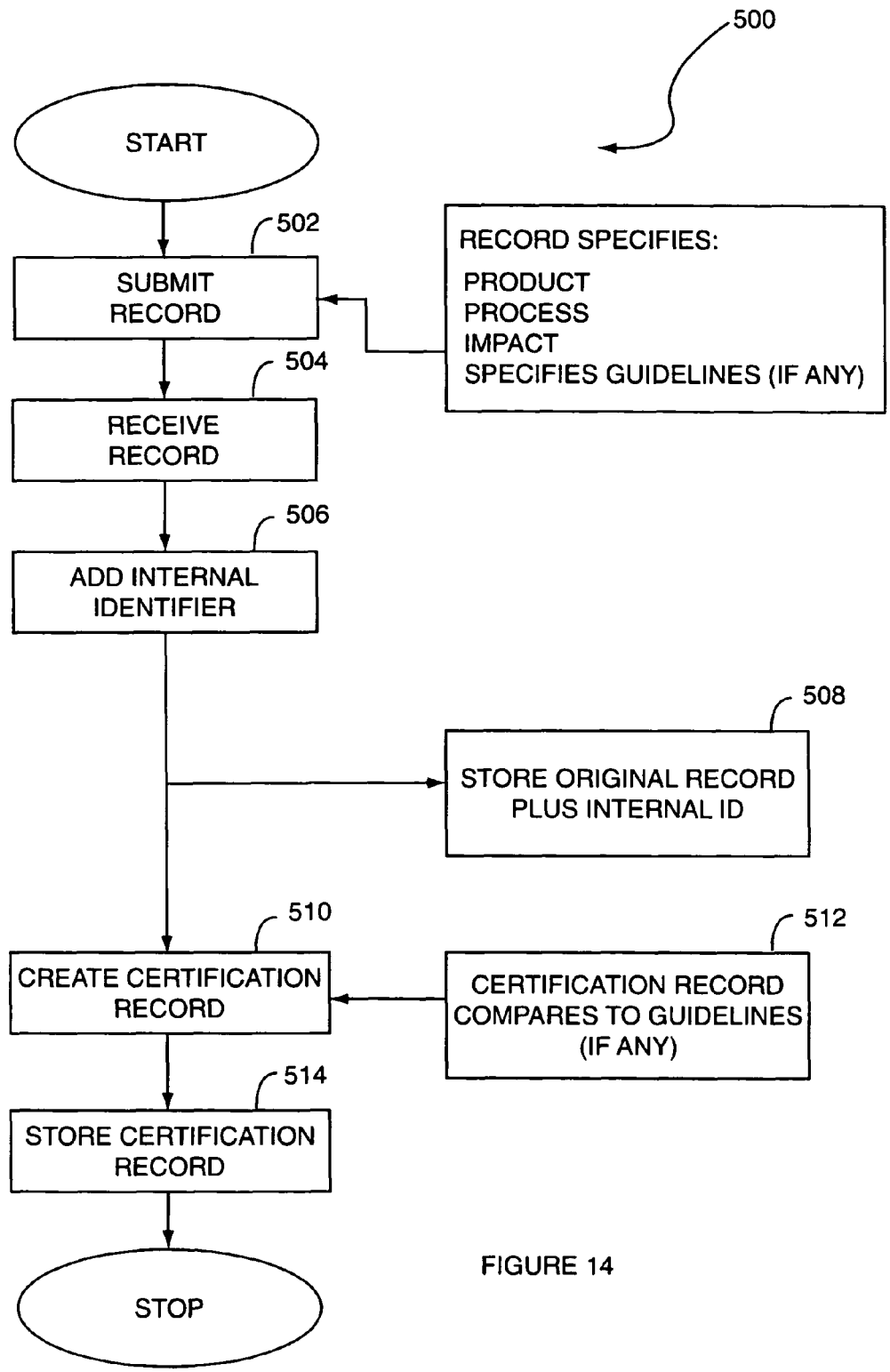
FIG. 14 is a flow chart illustrating a method, according to an exemplary embodiment of the present invention, of automatically generating a compliance result based on the automated comparison of agricultural product data against compliance requirements in the form of certification requirements.

FIG. 14 is a flow chart illustrating a method 500, according to an exemplary embodiment of the present invention, of automatically generating a compliance result based on the automated comparison of agricultural product data against compliance requirements in the form of certification requirements. While the method 500 is described below as generating a certification record based on a comparison against certification guidelines, it will be appreciated that any compliance result may be generated using substantially the same methodology. For example, a compliance record (e.g., regulatory) or an accreditation record may be generated substantially in the same manner.

The method 500 commences with the submission at block 502 from a submitter (e.g., custodian 48, an automated data capture mechanism 450 or other submitter 452) of a record 102, such as for example, the record illustrated in FIG. 5. In addition to the information specified in FIG. 5, the record 102 may also specify a particular product, particular production practices/processes 20 applied to that product, inputs used to produce/process the product 22, biological process 24 that influenced the production/processing of that product, the duration of time 26 that took place to produce/process the product, resultant impacts 30, and a guideline specifier that may be utilized to locate a guideline record 458 within the database 103. To this end, a custodian, for example, may when submitting agricultural product data specify that the record is contributing towards a determination as to whether a particular agricultural product complies with certain organic standards criteria. In a further embodiment, a witness may authenticate some or all the data submitted to add an additional level of credibility.

At block 504, the certification server 454 receives the record 102 from the submitter and, at block 506, the identification generator 476 adds an internal identifier 120 (or key) to the record 102. Again, the internal identifier may comprise a UPC, a lot number, or a code derived from the UPC and/or the lot number.

At block 508, the control module system 470 of the certification server 454 stores the original received record 102 in combination with the identifier 120 within the database 103.

At block 510, the certification tool 472 (or the regulatory tool 480 or accreditation tool 473) generates a compliance result in the exemplary form of a certification record (or regulatory compliance record or accreditation compliance record) by performing a comparison of compliance requirements against the captured agricultural product data. As described above, the compliance requirements for a specific certification record may be specified in a guideline record 458. The creation of the certification record 510 may include generating a compliance report that provides metrics, derived from the agricultural data, against a number of factors specified by an certification/accreditation/regulatory authority.

Further, the certification record 510 may indicate an affirmative compliance result or negative compliance result. The affirmative compliance result may comprise a standard certification, a government regulatory compliance approval, or an accreditation.

At block 514, the created certification record is then stored, either as an integral part of the product data record, or in a relational database as a distinct record that is keyed (or linked) to the agricultural product data record 102.

Methodology—User Product Information Retrieval

Figure 15:
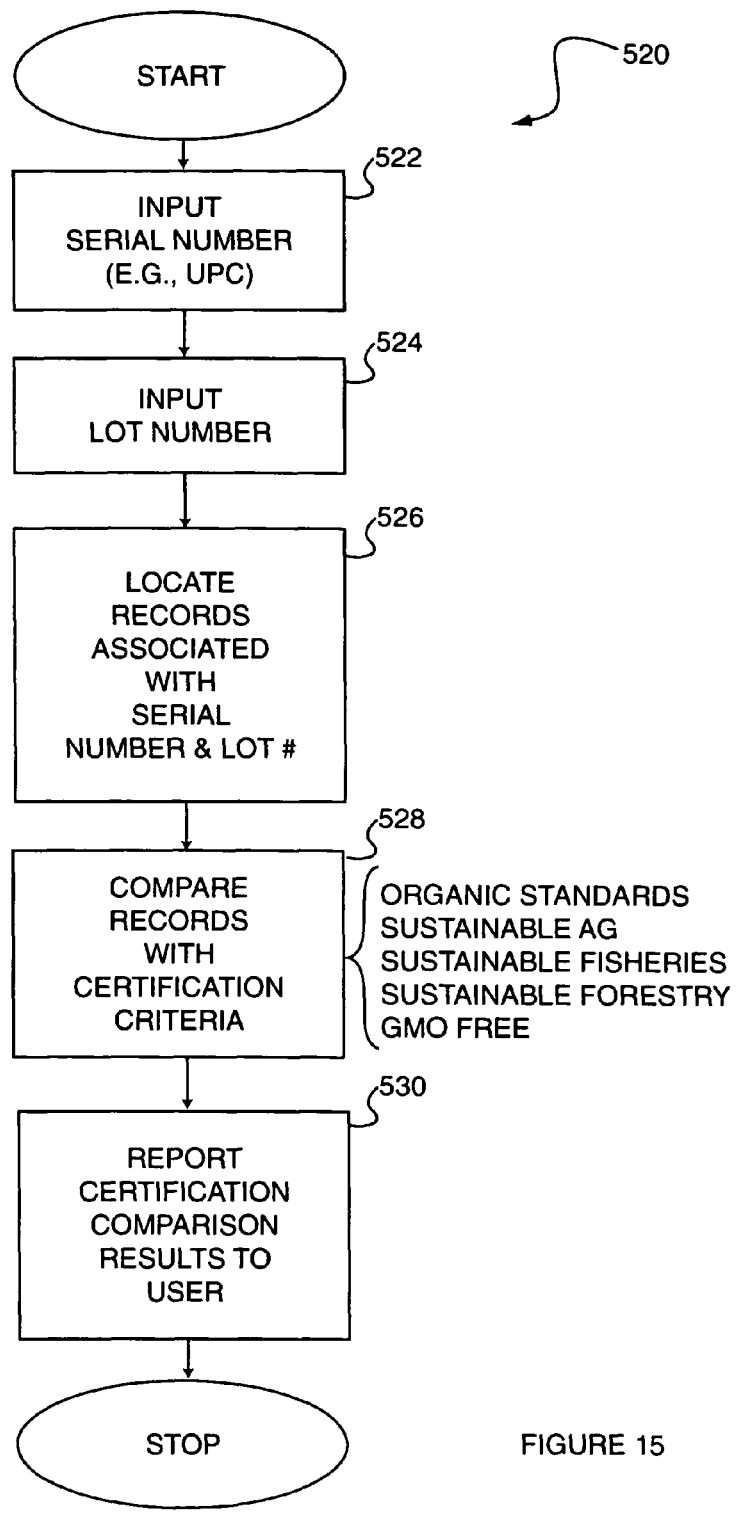
FIG. 15 is a flow chart illustrating a method, according to an exemplary embodiment of the present invention, of communicating agricultural product information to a user.

FIG. 15 is a flow chart illustrating a method 520, according to an exemplary embodiment of the present invention, of communicating agricultural product information to a user (e.g., a consumer, farmer or certification authority).

Figure 16A:
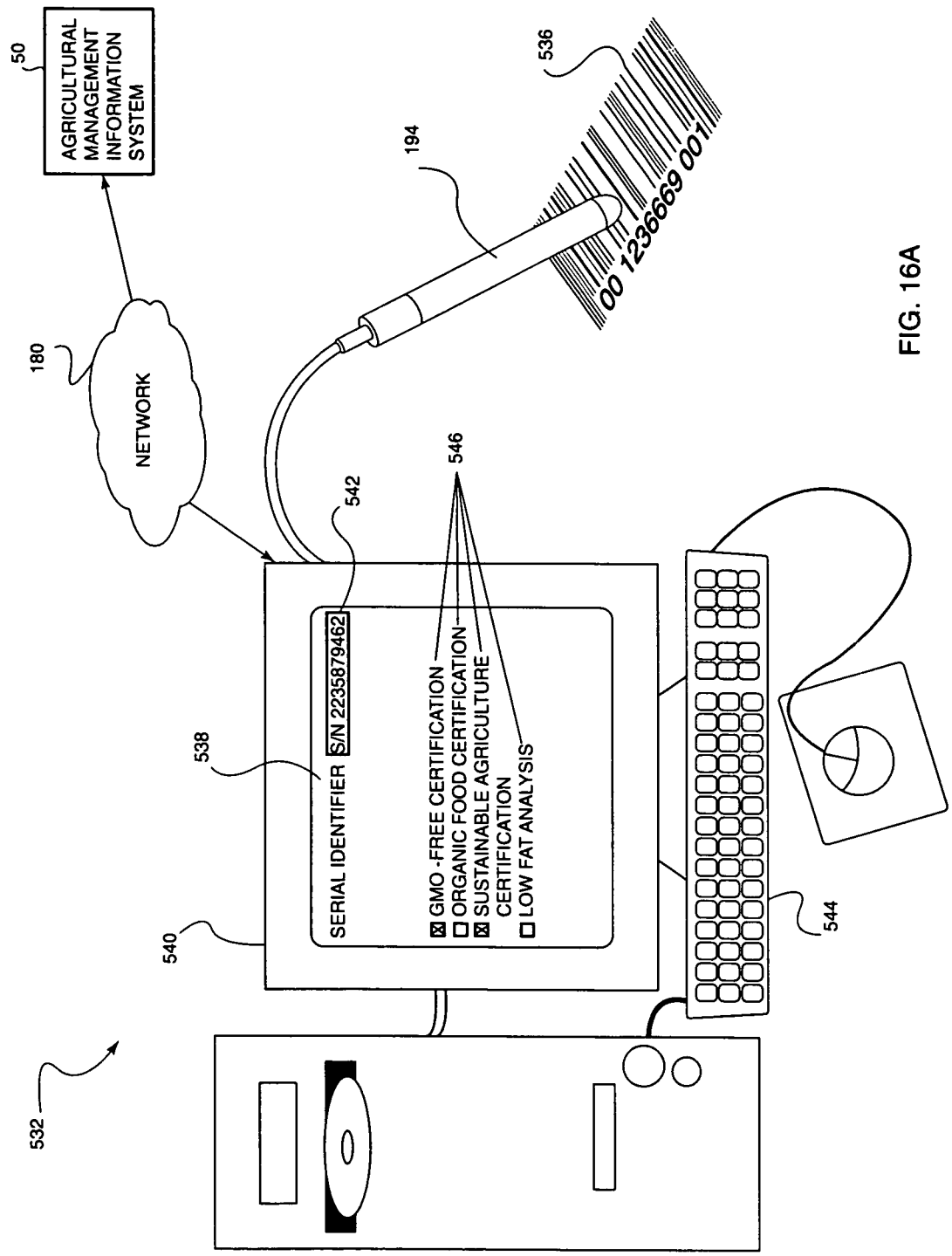
FIG. 16A illustrates the communication of a user interface by an agricultural management information system, via a network, to a computer system for display.

The method 520 commences at block 522 with the input of a serial number (e.g., a UPC) by an inquiring user 451 to the agricultural management information system 50. In one exemplary embodiment, the input of the serial number to the system 50 may be via a computer system 532 coupled via a network 180 to the agricultural management information system 50, as is illustrated in FIG. 16A. In the exemplary embodiment shown in FIG. 16A, a product identifier in the form of a UPC embodied in a barcode 536 printed on a label 534 is inputted to the computer system 532 via a barcode reader 194 that performs a read operation of the relevant barcode 536.

FIG. 16A also illustrates that the agricultural management information system 50 may communicate a user interface 538, via the network 180, to the computer system 532 for display on a display device 540 that forms part of the computer system 532. The user interface 538 may include a serial number input field 542. The serial number may be inputted into the input field 542 manually, utilizing a keyboard 544, or automatically utilizing the barcode reader 194.

The user interface 538 is also shown to present a menu of certification options 546, each option 546 having an associated check box that may be utilized to prompt the user to identify certain certification standards, criteria or guidelines, merely by example. By selecting associated check boxes, a user is able to identify, for example, certain certification standards by which the user is interested.

In one embodiment, the user interface 538 comprises a markup language document (e.g., a hypertext markup language (HTML) document) that is generated by a web server that forms part of the agricultural management information system 50. The input by the user to the interface 538 is communicated, via the network 180, back to the agricultural management information system 50 as a request for agricultural product information.

Figure 16B:
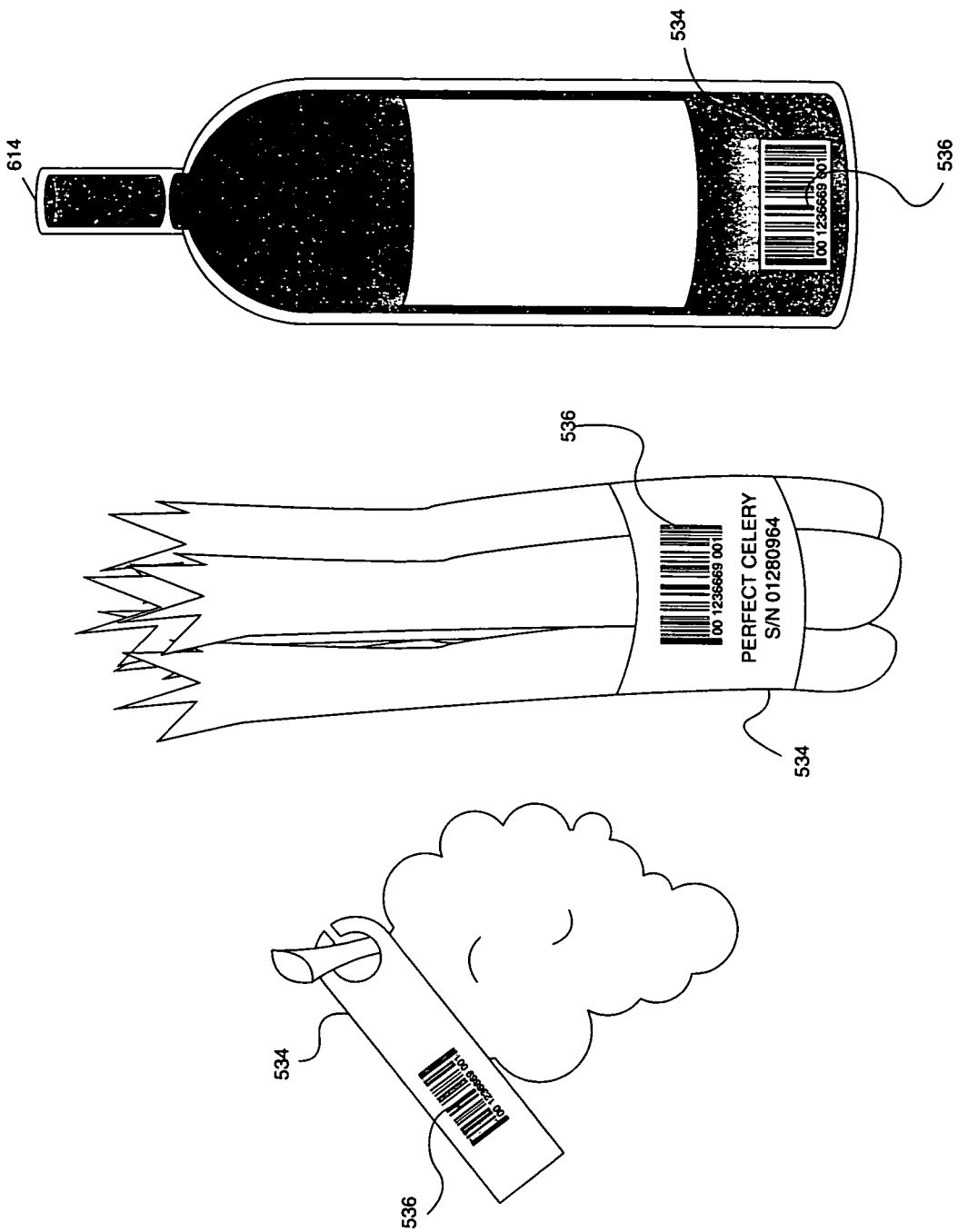
FIG. 16B illustrates exemplary labels, each bearing a respective barcode, as applied to an assortment of agricultural products.

FIG. 16B shows example labels 534, each bearing a respective barcode 536, as applied to an assortment of agricultural products. Further, while FIG. 16A illustrates a personal computer system 532 as being an input device, it will be appreciated that the request for agricultural product information may be inputted, by user 451, into any of a number of network-connected devices for communication via the network 180 to the agricultural management information system 50. For example, an appropriate interface to harvest information to be included in such a request may be presented on a PDA, a mobile telephone, a hand-held computer, a pager, or a radio-based communication device. While the UPC is also described in FIG. 16A should be entered via a keyboard 544, or utilizing a barcode reader 194, it will be appreciated that multiple other input mechanisms may be utilized to input the UPC. Specifically, an optical, radio, infrared, audio or video input mechanisms associated with a computing device may be utilized.

Returning to the method 520, illustrated in FIG. 15, at block 524, the user may optionally input a lot number for a particular agricultural product. The lot number may be entered in any one of the ways described above for the input of the serial number.

At block 526, the agricultural management information system 50, having now received a serial number and/or a lot number, proceeds to locate records associated with the serial and/or lot numbers. To this end, reference is again made to FIG. 12, which illustrates a hierarchy of records 102 and reports 408 associated with a specific UPC 402 and lot code 404 within the collection 400 being maintained within the database 103 of the agricultural management information system 50.

At block 528, having identified the appropriate records 102, the agricultural management information system 50, and more specifically the certification tool 472 of the certification server 454, proceeds to compare the identified records with certification criteria specified within an appropriate guideline record 458. Similarly, in an alternative embodiment, at block 528, the regulatory tool 480 may compare located records with regulatory criteria as specified within a guideline record 458. In a further embodiment, at block 528, the accreditation tool 473 may compare located records with accreditation criteria as specified within a guideline record 458. Examples of certification criteria are provided in FIG. 15.

At block 530, the results of the comparison operation performed at block 528 are reported to the user. In one exemplary embodiment, the comparison results may be reported in the form of a markup language document (e.g., a HTML document) that is generated by a web server of the agricultural management information system 50, and communicated via a network 180 to a computer system 532 operated by the user. The certification results may, in one embodiment, simply comprise a list of standards (e.g., certification, regulatory, accreditation, etc.) with which the relevant agricultural product complies. This embodiment may be directed towards a consumer who is interested in only high-level information. In an alternative embodiment, more detailed information may be communicated as part of the comparison results. For example, the certification tool 472 may provide a listing of criteria, with a metric indicated for each of the relevant criteria. The metric may comprise a certification status (e.g., pass, fail) or a relative compliance label (e.g., a grade, percentage value, rating relative to a standard, grade in terms such as poor, fair, good or super, or a statistically derived confidence interval). The resolution of information displayed with respect to a standard, and the criteria that define that standard, are customized to accommodate the requirements of a particular user.

While the comparison of the records with the criteria, at block 528, is described above as being performed responsive to the receipt of a request for agricultural product information, it will be appreciated that the comparison operation may be performed off-line, prior to the receipt of any request, and the results of the comparison stored as a report 408 within the collection 400 for later retrieval responsive to a request.

Figure 17A:
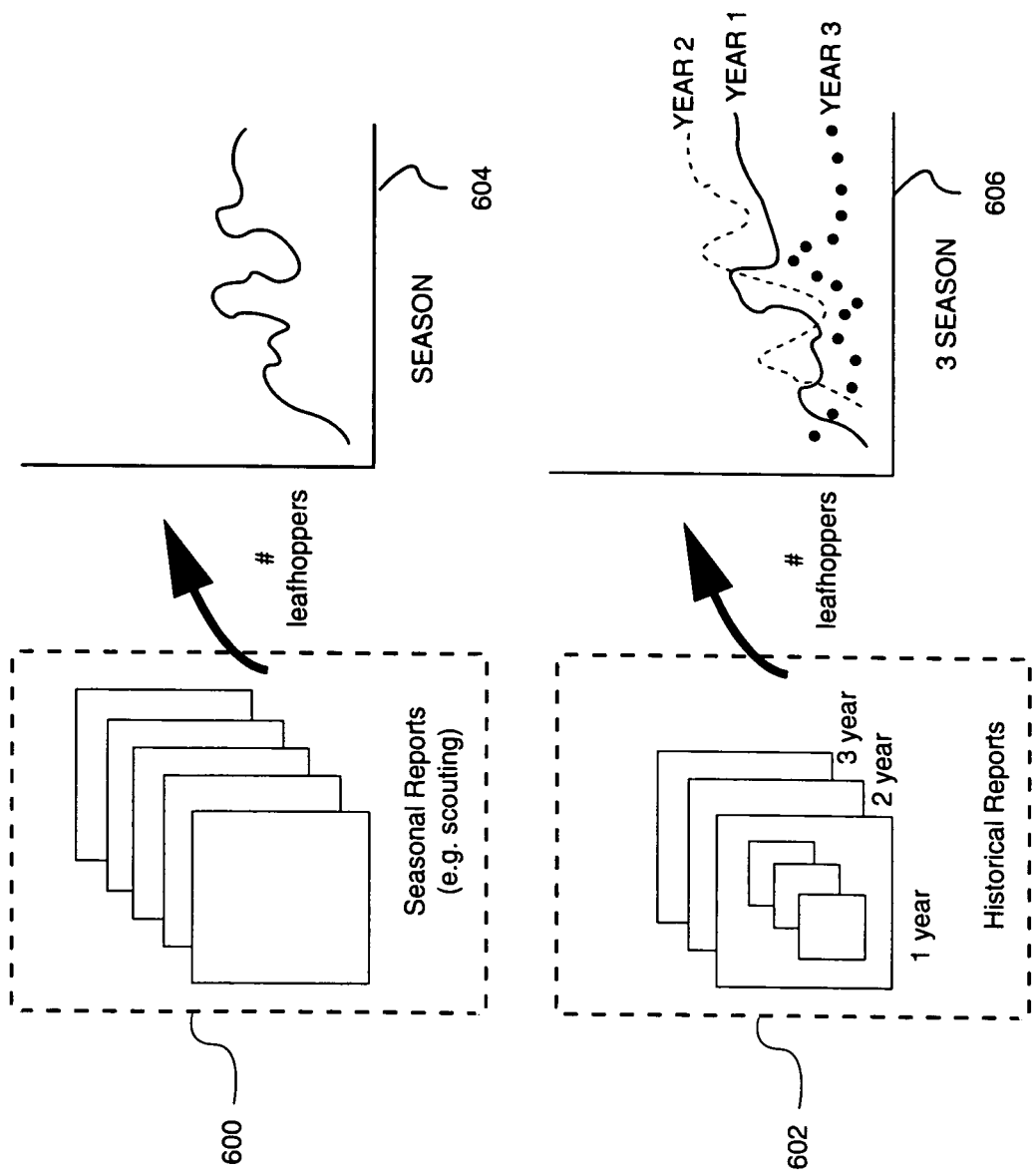
FIG. 17A illustrates exemplary seasonal reports and historic reports of a number of leafhoppers identified within a particular trap both seasonally and over a number of years, the reports being generated by the agricultural management information system.

The method 520 discussed with reference to FIG. 15 provides an example of reporting a level of compliance of an agricultural product, based on agricultural product data collected along the chain of custody, with a standard (e.g., a certification standard). It will nonetheless be appreciated that the information embodied in the records 102, as stored by the database of the agricultural management information system 50, is also very useful to a farmer (or producer, processor, etc.) for the purposes of evaluating performance of and reviewing of, an agricultural production system 15 over time (e.g., a season or one or more years as described in FIG. 2). To this end, a user may, in a manner similarly described with reference to FIG. 15, input information pertaining to an agricultural production system (e.g., a unit of production identifier), responsive to which the report tool 474 of the certification server 454 locates records associated with the relevant agricultural production system 15 (e.g., a field of land). In addition to an identifier for an agricultural product system 15, the request from the farmer may include a specific characteristic in which the user is interested. For example, the user may be interested in the number of pests (e.g., leafhoppers) observed at a particular trap within a particular season, or over a number of years. In this case, the report tool 475 is able to extract the appropriate data from the located records, and generate textual or graphic reports. To this end, FIG. 17A shows exemplary seasonal reports 600 and historic reports 602 of the number of leafhoppers identified within a particular trap both seasonally and over a number of years. Additionally, the report tool 475 generates graphs to provide a visual representation of observed or measured values for a particular characteristic.

FIG. 17B provides a further example of a weekly pest management monitoring report 620 that may be generated by the report tool 474 responsive to a request from a user 451. Once again, the information displayed in the report 620 is extracted from the connection 400 of records 102, responsive to a user inquiry.

Individual reports may also rank, rate, and/or provide descriptive and inferential statistics so as to provide a meaningful comparative view of the captured agricultural product data. Such reports go beyond a mere "yes/no" compliance, and enable a user to differentiate between custodians of an agricultural product based on a selected one, or multiple, metrics (e.g., environmental conditions, quality, time to market, etc.). A user 451 (e.g., a consumer) is then able to perform a comparative selection based on one or more metrics. For example, a consumer may request information regarding "good", "better" or "best" based on one or more metrics, or may elect to receive information regarding the top ten-percent of environmentally sound products, merely for example.

Similarly, at the end of a production cycle (e.g., a season) or a predefined time period (e.g., every six months, every twelve months, etc.), a user 451 (e.g., a farmer or other producer) may be presented with a summary report (or aggregation) of all compliance reports for the predetermined time period. Such a summary report may be utilized by the producer as a benchmark for future production cycles, to calculate end-of-cycle balances or for multiple other purposes.

Figure 17C:
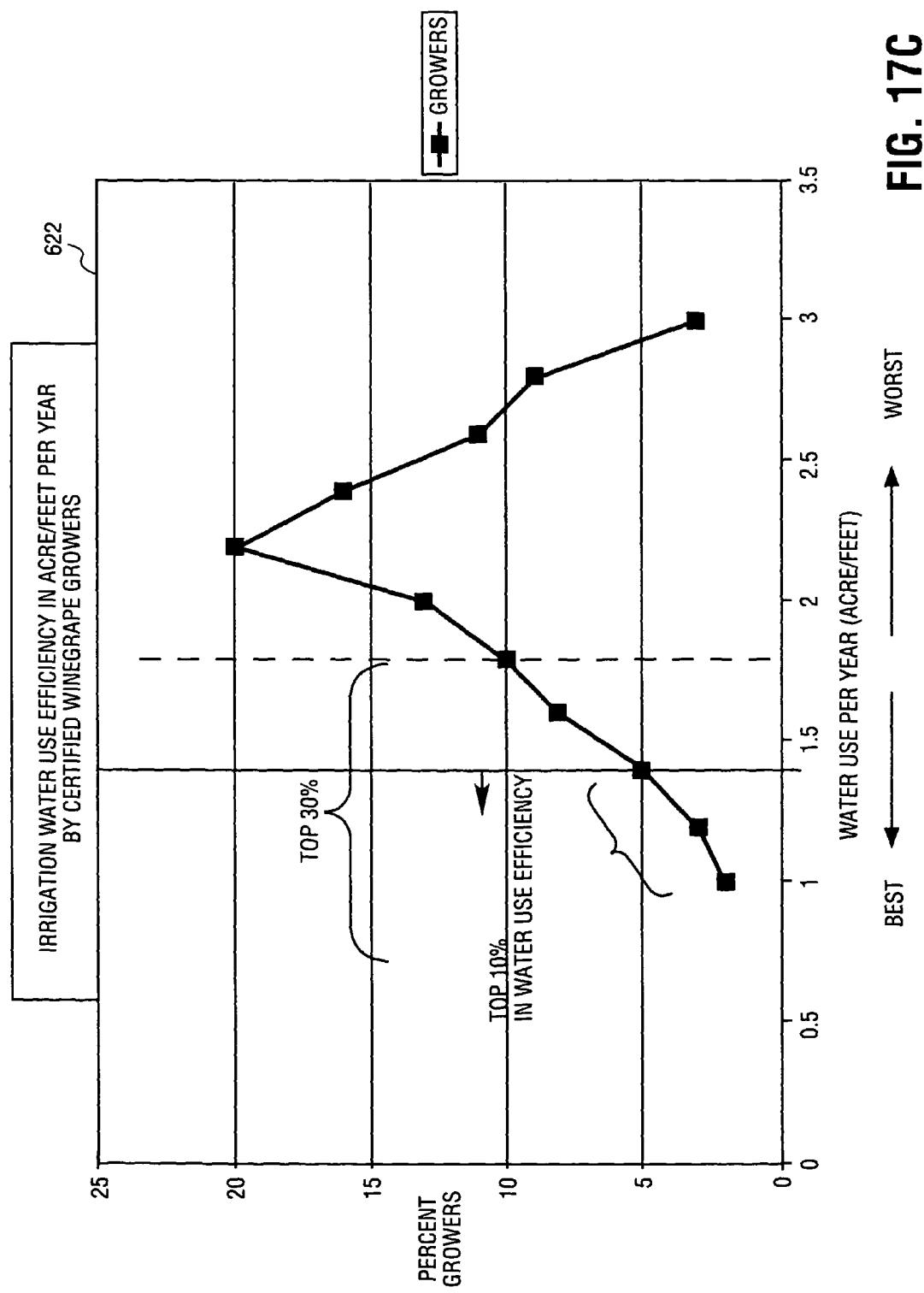
FIG. 17C illustrates an exemplary aggregate report that graphically illustrates water use efficiency per year measured in acre/feet for a group of wine grape growers, the aggregate report being generated by the agricultural management information system.

To this end, FIG. 17C provides an example of an aggregate report 622 that graphically illustrates water use efficiency per year measured in acre/feet for a group of winegrape growers. In this example, a rating system is based on the most efficient growers determined by the top ten percent of growers along a water use efficiency scale. In one embodiment, the report 622 may be hyperlinked so as to allow a user conveniently to "click through" the illustrated graph to identify the names of the growers in, for example, the top ten-percent for water use efficiency.

Figure 17D:
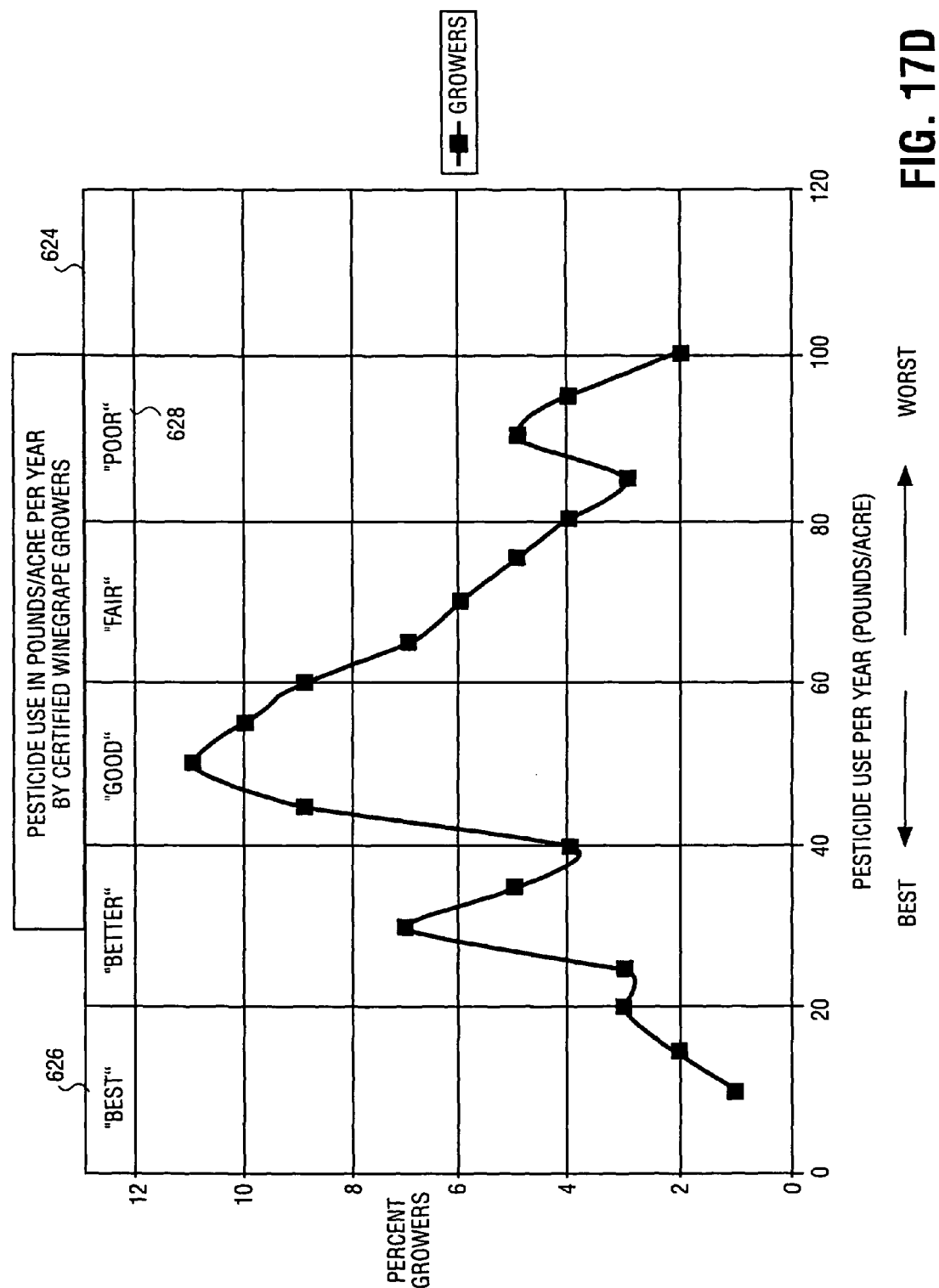
FIG. 17D illustrates an exemplary pesticide use report, as generated by the agricultural management information system.

FIG. 17D illustrates a further exemplary report in the form of a pesticide use report 624 that provides a graphic depiction of pesticide use per year measured by pounds applied per acre. In this example, a rating system is based on a five-category scale that ranges from "best" 626 to "poor" 628, with equal intervals defined at 20 lbs. per year. Accordingly, in contrast with the report 622 discussed with reference to FIG. 17 which provides a percentage-based rating, the report 624 illustrated in FIG. 17D provides discrete, descriptive classifications or ratings of growers. Again, the report 624 may provide a "click through" functionality so as to enable a user 451 conveniently to identify growers falling within each of the respective categories.

Further, a request to user 451 may require that a sample population be limited according to specified criteria. For example, the user 451 may specify that only a specific type of custodian (e.g., a grower, processor, transporter) be considered within a specific biologically meaningful unit (e.g., ecosystem, watershed, biological community, habitat, species population range, etc.), politically meaningful unit (e.g. country, state, region, county, city, town, village, etc.), and/or geographic region (e.g., section, town, range, etc.). Furthermore, the user 451 may request that the report only consider growers involved in one or more certification programs (e.g., organic, sustainable, integrated pest management, genetically-modified organism free, etc.). While irrigation water and pesticide use have been provided as examples of metrics of interest above, it will be appreciated that any one of a predetermined set of metrics may be selected. For example, user 451 may wish to view a comparative rating of a custodian based on energy use, impacts on water quality, impacts on air quality, level of biodiversity found in and around the production unit, time to market, ripeness, etc.

The reports discussed above may, in one embodiment, be generated as markup language documents that are communicated from the agricultural management information system 50, via the network 180, to a computer system 532.

Thus, a method and system to automatically certify an agricultural product, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
receiving, by a processor, first data associated with an impact on groundwater pollution and surface water pollution, the impact on the groundwater pollution and the surface water pollution resulting from a production of an agricultural product within a predetermined time period, the first data being received from a single agricultural production system;
receiving, by the processor, second data associated with the impact on the groundwater pollution and surface water pollution, the impact on the groundwater pollution and surface water pollution resulting from the production of the agricultural product within the predetermined time period, the second data being received from a plurality of agricultural production systems;
calculating, by the processor, descriptive and inferential statistic on the second data;
generating, by the processor, a benchmark result based on the second data and for comparing the first data against the second data benchmark; and
displaying, by the processor, in real-time the benchmark result and the descriptive and inferential statistic~and wherein the single agricultural production system includes one or more of a production unit, a production practice or a biological process.

2. The method of claim 1, wherein the single agricultural production system is a field of land.

3. A method comprising:
receiving, by a processor, first data associated with an impact on groundwater pollution and surface water pollution, the impact on the groundwater pollution and the surface water pollution resulting from a production of an agricultural product within a predetermined time period, the groundwater pollution and the surface water pollution comprising a contaminant of at least one of an inorganic or organic pollutant, the first data being received from a single agricultural production system;
receiving, by the processor, second data associated with the impact on the groundwater pollution and the surface water pollution, the impact on the groundwater pollution and the surface water pollution resulting from the production of the agricultural product within the predetermined time period, the second data being received from a plurality of agricultural production systems of a single watershed;
calculating, by the processor, descriptive and inferential statistic on the second data, the descriptive and inferential statistic comprising a statistically derived confidence interval;
generating, by the processor, a benchmark result based on the second data and for comparing of the first data associated with the impact on the groundwater pollution and the surface water pollution against the second data benchmark associated with the impact on the groundwater pollution and the surface water pollution; and displaying, by the processor, in real-time the benchmark result and the descriptive and inferential statistic in a graphical user interface, and wherein the single agricultural production system includes one or more of a production unit, a production practice or a biological process.

4. The method of claim 3, wherein the contaminant of the at least one of the inorganic or the organic pollutant comprises a nitrogen-based fertilizer.

5. The method of claim 4, wherein the nitrogen-based fertilizer is associated with the groundwater pollution.

6. The method of claim 3, wherein the contaminant of the at least one of the inorganic or the organic pollutant comprises a phosphorous-based fertilizer.

7. The method of claim 6, wherein the phosphorous-based fertilizer is associated with the surface water pollution.

8. The method of claim 3, wherein the contaminant of the at least one of the inorganic or the organic pollutant comprises a sediment.

9. The method of claim 3, wherein the first and second data are environmental data.

10. The method of claim 3, wherein the impact is a physical impact.

11. The method of claim 3, wherein the impact is a chemical impact.

\* \* \* \* \*